United States Patent
Gasn et al.

(10) Patent No.: US 9,501,453 B2
(45) Date of Patent: Nov. 22, 2016

(54) METHOD AND SYSTEM FOR A FLEXIBLE-DATA COLUMN USER INTERFACE

(75) Inventors: Marni Alyse Gasn, Palo Alto, CA (US); Yurika Sebata-Dempster, San Francisco, CA (US)

(73) Assignee: Salesforce.com Inc., San Francisco, CA (US)

(*) Notice: Subject to any disclaimer, the term of this patent is extended or adjusted under 35 U.S.C. 154(b) by 1238 days.

(21) Appl. No.: 12/004,731

(22) Filed: Dec. 23, 2007

(65) Prior Publication Data

US 2009/0164915 A1 Jun. 25, 2009

(51) Int. Cl.
*G06F 17/21* (2006.01)
*G06F 17/30* (2006.01)
*G06F 17/24* (2006.01)

(52) U.S. Cl.
CPC ....... *G06F 17/211* (2013.01); *G06F 17/30893* (2013.01); *G06F 17/30997* (2013.01); *G06F 17/245* (2013.01); *G06F 17/246* (2013.01)

(58) Field of Classification Search
CPC ... G06F 17/211; G06F 17/245; G06F 17/246
USPC ........................................................ 715/753
See application file for complete search history.

(56) References Cited

U.S. PATENT DOCUMENTS

| | | | |
|---|---|---|---|
| 4,847,696 A * | 7/1989 | Matsumoto et al. | 386/291 |
| 5,201,047 A * | 4/1993 | Maki | G06F 17/30598 |
| 5,255,356 A * | 10/1993 | Michelman et al. | 715/217 |
| 5,396,621 A * | 3/1995 | MacGregor et al. | 715/809 |
| 5,461,708 A * | 10/1995 | Kahn | 345/440 |
| 5,535,324 A * | 7/1996 | Alvarez et al. | 715/209 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,926,822 A * | 7/1999 | Garman | 715/201 |
| 5,963,953 A | 10/1999 | Cram et al. | |
| 6,006,239 A * | 12/1999 | Bhansali et al. | |
| 6,029,175 A | 2/2000 | Chow et al. | |

(Continued)

OTHER PUBLICATIONS

Frederick Chong, Gianpaolo Carraro, and Roger Wolter. Multi-Tenant Data Architecture, Jun. 2006, MSDN Library—Software and Services, Microsoft Corporation, retrieved from http://msdn.microsoft.comlen-us/library/aa479086(d=printer).aspx.*

(Continued)

*Primary Examiner* — Eric Wiener
(74) *Attorney, Agent, or Firm* — Haynes Beffel Wolfeld LLP; Ernest J. Beffel, Jr.

(57) ABSTRACT

In embodiments there are provided techniques for flexibly displaying information into one or more columns. One technique includes the user interface (UI) receiving from an end user a selection of display criteria configured by an administrative user. Data from a dataset may be selected and/or ordered for displaying according to the criterion selected by the end user. Alternative embodiments may provide displaying positive and negative data, sorting, and fixed locations.

26 Claims, 15 Drawing Sheets

(56) References Cited

U.S. PATENT DOCUMENTS

| | | | |
|---|---|---|---|
| 6,058,391 A * | 5/2000 | Gardner | |
| 6,092,083 A | 7/2000 | Brodersen et al. | |
| 6,157,934 A * | 12/2000 | Khan et al. | 715/234 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,185,582 B1 * | 2/2001 | Zellweger et al. | 715/212 |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,308,168 B1 * | 10/2001 | Dovich et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,341,292 B1 * | 1/2002 | Cho et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,460,059 B1 * | 10/2002 | Wisniewski | 715/212 |
| 6,535,909 B1 | 3/2003 | Rust | |
| 6,549,878 B1 * | 4/2003 | Lowry et al. | 715/219 |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,592,626 B1 * | 7/2003 | Bauchot et al. | 715/217 |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,631,497 B1 * | 10/2003 | Jamshidi et al. | 715/205 |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,801,229 B1 * | 10/2004 | Tinkler | 715/853 |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,988,241 B1 * | 1/2006 | Guttman et al. | 715/220 |
| 7,000,181 B2 * | 2/2006 | Press | 715/212 |
| 7,062,502 B1 | 6/2006 | Kesler | |
| 7,069,231 B1 | 6/2006 | Cinarkaya et al. | |
| 7,069,497 B1 | 6/2006 | Desai | |
| 7,107,519 B1 * | 9/2006 | Webster et al. | 715/212 |
| 7,117,448 B2 * | 10/2006 | Cooper et al. | 715/764 |
| 7,143,340 B2 * | 11/2006 | Brid | 715/227 |
| 7,181,758 B1 | 2/2007 | Chan | |
| 7,249,328 B1 * | 7/2007 | Davis | 715/853 |
| 7,266,763 B2 * | 9/2007 | Peyton-Jones et al. | 715/213 |
| 7,272,637 B1 * | 9/2007 | Himmelstein | 709/217 |
| 7,289,976 B2 | 10/2007 | Kihneman et al. | |
| 7,308,457 B1 * | 12/2007 | Sundman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,415,481 B2 * | 8/2008 | Becker et al. | |
| 7,426,688 B2 * | 9/2008 | Serra et al. | 715/212 |
| 7,508,789 B2 | 3/2009 | Chan | |
| 7,516,153 B2 * | 4/2009 | Hackworth et al. | |
| 7,516,191 B2 | 4/2009 | Brouk et al. | |
| 7,577,706 B2 | 8/2009 | Arregui et al. | |
| 7,584,417 B2 * | 9/2009 | Friend et al. | 715/224 |
| 7,593,943 B2 * | 9/2009 | Clarke et al. | |
| 7,603,483 B2 | 10/2009 | Psounis et al. | |
| 7,620,655 B2 | 11/2009 | Larsson et al. | |
| 7,647,241 B1 * | 1/2010 | Lilly et al. | 705/7.26 |
| 7,676,843 B1 * | 3/2010 | Stott et al. | 726/26 |
| 7,685,152 B2 * | 3/2010 | Chivukula et al. | 707/999.102 |
| 7,689,711 B2 | 3/2010 | Brouk et al. | |
| 7,698,160 B2 | 4/2010 | Beaven et al. | |
| 7,703,021 B1 * | 4/2010 | Flam | 715/741 |
| 7,730,478 B2 | 6/2010 | Weissman | |
| 7,747,969 B2 * | 6/2010 | Danninger | 715/843 |
| 7,752,536 B2 * | 7/2010 | Megiddo et al. | 715/216 |
| 7,765,467 B2 * | 7/2010 | Malek et al. | 715/234 |
| 7,774,366 B2 | 8/2010 | Fisher et al. | |
| 7,779,039 B2 | 8/2010 | Weissman et al. | |
| 7,779,475 B2 | 8/2010 | Jakobson et al. | |
| 7,788,399 B2 | 8/2010 | Brouk et al. | |
| 7,818,298 B2 | 10/2010 | Barker et al. | |
| 7,851,004 B2 | 12/2010 | Hirao et al. | |
| 7,949,684 B2 | 5/2011 | Brooks et al. | |
| 7,991,790 B2 | 8/2011 | Barker et al. | |
| 7,991,798 B2 * | 8/2011 | Arora | 707/803 |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,097,078 B2 * | 1/2012 | Collins | 106/134.2 |
| 8,112,445 B2 | 2/2012 | Weissman et al. | |
| 8,126,900 B1 * | 2/2012 | Kostamaa et al. | 707/756 |
| 8,145,651 B2 | 3/2012 | Weissman | |
| 8,150,833 B1 | 4/2012 | Scotton et al. | |
| 8,156,205 B1 | 4/2012 | Forsberg et al. | |
| 8,209,308 B2 | 6/2012 | Rueben et al. | |
| 8,209,333 B2 | 6/2012 | Hubbard et al. | |
| 8,234,290 B2 | 7/2012 | Hofhansi et al. | |
| 8,239,501 B1 | 8/2012 | Forsberg et al. | |
| 8,244,759 B2 | 8/2012 | Brooks et al. | |
| 8,255,566 B2 | 8/2012 | Brouk et al. | |
| 8,271,641 B2 | 9/2012 | Fry et al. | |
| 8,271,837 B2 | 9/2012 | Prophete et al. | |
| 8,275,836 B2 | 9/2012 | Beaven et al. | |
| 8,301,612 B2 | 10/2012 | Barker et al. | |
| 8,301,993 B2 * | 10/2012 | Matsa et al. | 715/212 |
| 8,312,047 B2 | 11/2012 | Barker et al. | |
| 8,332,435 B2 | 12/2012 | Ballard et al. | |
| 8,332,436 B2 | 12/2012 | Ballard et al. | |
| 8,332,437 B2 | 12/2012 | Ballard et al. | |
| 8,402,028 B2 | 3/2013 | Weissman | |
| 8,402,045 B2 | 3/2013 | Scotton et al. | |
| 8,407,184 B2 | 3/2013 | Prophete et al. | |
| 8,443,085 B2 | 5/2013 | Jensen-Horne et al. | |
| 8,452,726 B2 | 5/2013 | Kuruganti et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,756,275 B2 | 6/2014 | Jakobson | |
| 8,769,004 B2 | 7/2014 | Jakobson | |

(56) References Cited

U.S. PATENT DOCUMENTS

| | | |
|---|---|---|
| 8,769,017 B2 | 7/2014 | Jakobson |
| 2001/0044791 A1 | 11/2001 | Richter et al. |
| 2001/0049819 A1 | 12/2001 | Pereboom |
| 2001/0053719 A1* | 12/2001 | Kawasaki et al. ............ 473/131 |
| 2002/0010743 A1* | 1/2002 | Ryan et al. .................. 709/205 |
| 2002/0019827 A1 | 2/2002 | Shiman et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0138564 A1* | 9/2002 | Treptow et al. ............. 709/203 |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0154387 A1 | 8/2003 | Evans et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0002988 A1 | 1/2004 | Seshadri et al. |
| 2004/0010489 A1 | 1/2004 | Rio |
| 2004/0015783 A1* | 1/2004 | Lennon et al. ............. 715/523 |
| 2004/0015981 A1 | 1/2004 | Coker et al. |
| 2004/0027388 A1 | 2/2004 | Berg et al. |
| 2004/0064470 A1* | 4/2004 | Raue ............ 707/100 |
| 2004/0103365 A1* | 5/2004 | Cox .............. 715/503 |
| 2004/0103369 A1* | 5/2004 | Robertson et al. ........... 715/509 |
| 2004/0117392 A1* | 6/2004 | Burgmeier .................. 707/100 |
| 2004/0122839 A1* | 6/2004 | Spriestersbach ............. 707/101 |
| 2004/0128001 A1 | 7/2004 | Levin et al. |
| 2004/0153966 A1* | 8/2004 | Richmond et al. ........... 715/509 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199497 A1* | 10/2004 | Timmons .................... 707/3 |
| 2004/0199536 A1 | 10/2004 | Barnes Leon et al. |
| 2004/0199543 A1 | 10/2004 | Braud et al. |
| 2004/0230903 A1 | 11/2004 | Elza et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010635 A1 | 1/2005 | Schwesig et al. |
| 2005/0039114 A1* | 2/2005 | Naimat et al. .............. 715/503 |
| 2005/0050555 A1 | 3/2005 | Exley et al. |
| 2005/0091098 A1 | 4/2005 | Brodersen et al. |
| 2005/0102229 A1* | 5/2005 | Kemper et al. ............. 705/39 |
| 2005/0120293 A1* | 6/2005 | Benhase et al. ............. 715/504 |
| 2005/0198325 A1* | 9/2005 | Holland et al. ............. 709/229 |
| 2005/0198329 A1* | 9/2005 | Byrd et al. .................. 709/229 |
| 2005/0223022 A1 | 10/2005 | Weissman et al. |
| 2005/0283494 A1* | 12/2005 | Colossi et al. ............... 707/102 |
| 2005/0289170 A1* | 12/2005 | Brown .............. G06F 17/30126 |
| 2006/0010058 A1* | 1/2006 | D'Hers et al. ................ 705/35 |
| 2006/0021019 A1 | 1/2006 | Hinton et al. |
| 2006/0031308 A1 | 2/2006 | Colson et al. |
| 2006/0053196 A1 | 3/2006 | Spataro et al. |
| 2006/0074866 A1* | 4/2006 | Chamberlain et al. .......... 707/3 |
| 2006/0129593 A1* | 6/2006 | Slovak et al. ................ 707/102 |
| 2006/0129914 A1* | 6/2006 | Ellis et al. .................... 715/504 |
| 2006/0129926 A1* | 6/2006 | Malek et al. ................. 715/530 |
| 2006/0136511 A1 | 6/2006 | Ngo et al. |
| 2006/0143558 A1 | 6/2006 | Albornoz et al. |
| 2006/0156257 A1* | 7/2006 | Chen et al. .................... 715/859 |
| 2006/0206507 A1* | 9/2006 | Dahbour ....................... 707/100 |
| 2006/0206834 A1 | 9/2006 | Fisher et al. |
| 2007/0060099 A1 | 3/2007 | Ramer et al. |
| 2007/0061384 A1 | 3/2007 | Harrington et al. |
| 2007/0061698 A1* | 3/2007 | Megiddo et al. ............. 715/503 |
| 2007/0088741 A1 | 4/2007 | Brooks et al. |
| 2007/0100817 A1 | 5/2007 | Acharya et al. |
| 2007/0100960 A1 | 5/2007 | Eichstaedt et al. |
| 2007/0124323 A1* | 5/2007 | Hackworth et al. .......... 707/102 |
| 2007/0130502 A1* | 6/2007 | Tolgu et al. .................. 715/503 |
| 2007/0130507 A1* | 6/2007 | Bertram ........................ 715/509 |
| 2007/0150515 A1 | 6/2007 | Brave et al. |
| 2007/0174317 A1* | 7/2007 | Bangel et al. ................ 707/101 |
| 2007/0220417 A1 | 9/2007 | Mathew et al. |
| 2007/0226204 A1 | 9/2007 | Feldman |
| 2007/0226807 A1 | 9/2007 | Ginter et al. |
| 2007/0260648 A1 | 11/2007 | Friesenhahn et al. |
| 2007/0282479 A1* | 12/2007 | Shibuya et al. .............. 700/111 |
| 2008/0010243 A1 | 1/2008 | Weissman et al. |
| 2008/0082572 A1 | 4/2008 | Ballard et al. |
| 2008/0086479 A1 | 4/2008 | Fry et al. |
| 2008/0086482 A1 | 4/2008 | Weissman |
| 2008/0104408 A1 | 5/2008 | Mayer |
| 2008/0127310 A1 | 5/2008 | Robbins et al. |
| 2008/0162544 A1 | 7/2008 | Weissman et al. |
| 2008/0208630 A1* | 8/2008 | Fors et al. ........................ 705/3 |
| 2008/0208631 A1* | 8/2008 | Morita et al. .................... 705/3 |
| 2008/0229242 A1* | 9/2008 | Goering ........................ 715/810 |
| 2008/0244379 A1* | 10/2008 | Busse et al. ................... 715/227 |
| 2008/0249972 A1 | 10/2008 | Dillon |
| 2008/0270354 A1 | 10/2008 | Weissman |
| 2008/0270987 A1 | 10/2008 | Weissman |
| 2008/0306883 A1 | 12/2008 | Baffier et al. |
| 2009/0024609 A1 | 1/2009 | Barker et al. |
| 2009/0049053 A1 | 2/2009 | Barker et al. |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0063415 A1 | 3/2009 | Chatfield et al. |
| 2009/0100342 A1 | 4/2009 | Jakobson |
| 2009/0164915 A1 | 6/2009 | Gasn et al. |
| 2009/0177744 A1 | 7/2009 | Marlow et al. |
| 2010/0070528 A1 | 3/2010 | Collins et al. |
| 2010/0076946 A1 | 3/2010 | Barker et al. |
| 2010/0088316 A1 | 4/2010 | Robinson et al. |
| 2010/0088636 A1 | 4/2010 | Yerkes et al. |
| 2010/0114912 A1 | 5/2010 | Hofhansl et al. |
| 2010/0205227 A1 | 8/2010 | Weissman et al. |
| 2010/0205595 A1 | 8/2010 | Weissman |
| 2010/0223284 A1 | 9/2010 | Brooks et al. |
| 2010/0223467 A1 | 9/2010 | Dismore et al. |
| 2010/0299608 A1 | 11/2010 | Fisher et al. |
| 2010/0306536 A1 | 12/2010 | Brouk et al. |
| 2011/0023017 A1 | 1/2011 | Calvin |
| 2011/0029879 A1 | 2/2011 | Calvin |
| 2011/0071995 A1 | 3/2011 | Fisher et al. |
| 2011/0071996 A1 | 3/2011 | Fisher et al. |
| 2011/0072385 A1 | 3/2011 | Fisher et al. |
| 2011/0072386 A1 | 3/2011 | Fisher et al. |
| 2011/0072387 A1 | 3/2011 | Fisher et al. |
| 2011/0082854 A1 | 4/2011 | Eidson et al. |
| 2011/0106808 A1 | 5/2011 | Hersans et al. |
| 2011/0196883 A1 | 8/2011 | Brooks et al. |
| 2011/0197186 A1 | 8/2011 | Barker et al. |

(56) References Cited

U.S. PATENT DOCUMENTS

| | | |
|---|---|---|
| 2011/0202508 A1 | 8/2011 | Brooks et al. |
| 2011/0202911 A1 | 8/2011 | Brooks et al. |
| 2011/0208739 A1 | 8/2011 | Weissman |
| 2011/0209094 A1 | 8/2011 | Gasn et al. |
| 2011/0213816 A1 | 9/2011 | Doshi et al. |
| 2011/0218958 A1 | 9/2011 | Warshavsky et al. |
| 2011/0225232 A1 | 9/2011 | Casalaina et al. |
| 2011/0225233 A1 | 9/2011 | Casalaina et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0225525 A1 | 9/2011 | Chasman et al. |
| 2011/0225527 A1 | 9/2011 | Law et al. |
| 2011/0231831 A1 | 9/2011 | Smith et al. |
| 2011/0246527 A1 | 10/2011 | Bitting et al. |
| 2011/0247051 A1 | 10/2011 | Bulumulla et al. |
| 2011/0252314 A1 | 10/2011 | Barker et al. |
| 2011/0258225 A1 | 10/2011 | Taylor et al. |
| 2011/0264650 A1 | 10/2011 | Tobin et al. |
| 2011/0264681 A1 | 10/2011 | Kimberlin et al. |
| 2011/0274258 A1 | 11/2011 | Casalaina et al. |
| 2011/0274261 A1 | 11/2011 | Casalaina et al. |
| 2011/0276601 A1 | 11/2011 | Pin et al. |
| 2011/0276674 A1 | 11/2011 | Jensen-Horne et al. |
| 2011/0276693 A1 | 11/2011 | Jensen-Horne et al. |
| 2011/0276890 A1 | 11/2011 | Jensen-Horne et al. |
| 2011/0276892 A1 | 11/2011 | Jensen-Horne et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0295838 A1 | 12/2011 | Collins et al. |
| 2011/0295910 A1 | 12/2011 | Ziemann et al. |
| 2011/0296336 A1 | 12/2011 | Law et al. |
| 2011/0296386 A1 | 12/2011 | Woollen et al. |
| 2011/0302133 A1 | 12/2011 | Kuruganti et al. |
| 2011/0302135 A1 | 12/2011 | Prophete et al. |
| 2011/0302454 A1 | 12/2011 | Prophete et al. |
| 2011/0302479 A1 | 12/2011 | Movida et al. |
| 2012/0023107 A1 | 1/2012 | Nachnani et al. |
| 2012/0041986 A1 | 2/2012 | Weissman et al. |
| 2012/0042218 A1 | 2/2012 | Cinarkaya et al. |
| 2012/0042279 A1 | 2/2012 | Naderi |
| 2012/0054241 A1 | 3/2012 | Brooks et al. |
| 2012/0054328 A1 | 3/2012 | Brooks et al. |
| 2012/0054632 A1 | 3/2012 | Ballard et al. |
| 2012/0054633 A1 | 3/2012 | Ballard et al. |
| 2012/0059807 A1 | 3/2012 | Brooks et al. |
| 2012/0059862 A1 | 3/2012 | Brooks et al. |
| 2012/0066672 A1 | 3/2012 | Smith et al. |
| 2012/0078981 A1 | 3/2012 | Gradin et al. |
| 2012/0084266 A1 | 4/2012 | Brooks et al. |
| 2012/0089610 A1 | 4/2012 | Agrawal et al. |
| 2012/0096521 A1 | 4/2012 | Peddada |
| 2012/0102420 A1 | 4/2012 | Fukahori |
| 2012/0109887 A1 | 5/2012 | Ziemann et al. |
| 2012/0131068 A1 | 5/2012 | Scotton et al. |
| 2012/0144332 A1 | 6/2012 | Sola |
| 2012/0151338 A1 | 6/2012 | Forsberg et al. |
| 2012/0151444 A1 | 6/2012 | Weissman |
| 2012/0158834 A1 | 6/2012 | Brouk et al. |
| 2012/0158835 A1 | 6/2012 | Brouk et al. |
| 2012/0191865 A1 | 7/2012 | Duff et al. |
| 2012/0233137 A1 | 9/2012 | Jakobson et al. |
| 2012/0233191 A1 | 9/2012 | Ramanujam |
| 2012/0239629 A1 | 9/2012 | Brooks et al. |
| 2012/0246120 A1 | 9/2012 | Brooks et al. |
| 2012/0260191 A1 | 10/2012 | Ballard et al. |
| 2012/0290407 A1 | 11/2012 | Hubbard et al. |
| 2012/0304014 A1 | 11/2012 | Prophete et al. |
| 2012/0310989 A1 | 12/2012 | Weissman et al. |
| 2012/0317146 A1 | 12/2012 | Brooks et al. |
| 2012/0317495 A1 | 12/2012 | Ballard et al. |
| 2012/0324125 A1 | 12/2012 | Brouk et al. |
| 2012/0330644 A1 | 12/2012 | Giraudy et al. |
| 2012/0330960 A1 | 12/2012 | Koosel et al. |
| 2012/0331016 A1 | 12/2012 | Janson et al. |
| 2013/0007148 A1 | 1/2013 | Olsen |
| 2013/0018890 A1 | 1/2013 | Rajan et al. |
| 2013/0024412 A1 | 1/2013 | Gong et al. |
| 2013/0036086 A1 | 2/2013 | Barker et al. |
| 2013/0036142 A1 | 2/2013 | Barker et al. |
| 2013/0055078 A1 | 2/2013 | Berger et al. |
| 2013/0055159 A1 | 2/2013 | Levine et al. |
| 2013/0055233 A1 | 2/2013 | Hatton et al. |
| 2013/0097540 A1 | 4/2013 | Ballard et al. |
| 2013/0117291 A1 | 5/2013 | Roy-Faderman |
| 2013/0151231 A1 | 6/2013 | Giraudy et al. |
| 2013/0159279 A1 | 6/2013 | Hofhansl et al. |
| 2013/0173720 A1 | 7/2013 | Vasudev et al. |
| 2013/0212497 A1 | 8/2013 | Zelenko et al. |
| 2013/0247216 A1 | 9/2013 | Cinarkaya et al. |

OTHER PUBLICATIONS

U.S. Appl. No. 11/825,393, filed Jul. 6, 2007, Timothy Barker.
U.S. Appl. No. 11/879,535, filed Jul. 17, 2007, Timothy Barker.
U.S. Appl. No. 11/880,197, filed Jul. 20, 2007, Timothy Barker.
U.S. Appl. No. 11/893,617, filed Aug. 15, 2007, Timothy Barker.
Title: "!Tunes", ® 2000-2008 URL: http://www.itunes.com/download Company: Apple, Inc. (No. of pp. 5).
Title: "NextPage", Date: Jul. 6, 2007 URL: http://web.archive.org/web/20060719184011/http://nextpage.com/Company: NextPage Global Headquarters, 13997 South Minuteman Drive, Draper, UT 84020, (No. of pp. 6).
Title: DabbleDB, Web Archive Date: Aug. 11, 2007 http://web.archive.org/web/20070811193023/http://www.dabbledb.com/Company: Smallthought Systems Inc. (No. of pp. 13).

* cited by examiner

METHOD AND SYSTEM FOR A FLEXIBLE-DATA COLUMN USER INTERFACE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007; and U.S. patent application Ser. No. 11/893,617 entitled METHOD AND SYSTEM FOR PUSHING DATA TO SUBSCRIBERS IN AN ON-DEMAND SERVICE, by Timothy Barker et al., filed Aug. 15, 2007;

U.S. patent application Ser. No. 11/879,535 entitled SYSTEM AND METHOD FOR TRACKING DOCUMENTS IN AN ON-DEMAND SERVICE, by Timothy Barker et al., filed Jul. 17, 2007; and U.S. patent application Ser. No. 12/004,731 entitled METHOD AND SYSTEM FOR A FLEXIBLE-DATA COLUMN USER INTERFACE, by Marni Alyse Gam et al., filed Dec. 23, 2007.

FIELD OF THE INVENTION

The current invention relates generally to presentation of characteristics of data in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The ease of use of accurate information and subsequent delivery of this information to the user system in a manner that is convenient is desirable.

Unfortunately, conventional database approaches might be inflexible or awkward to use when, for example, the user desires to change which characteristics associated with a set of data are presented to the user. In some systems, only the administrator can change which properties the user can see with a set of data.

Accordingly, it is desirable to provide techniques enabling the user to easily change which characteristics of a set of data are presented to the user to improve the ease of use of the database system.

BRIEF SUMMARY

In accordance with embodiments, there are provided mechanisms and methods for a flexible-data column user interface. These mechanisms and methods for a flexible-data column user interface can enable embodiments to provide a presentation of characteristics of data, where the user may change which characteristics are presented to the user. A characteristic of the data is information about the data or associated with the data. For example, if the data is a list of identifiers of documents, the characteristics may be information about the documents, such as the size of the file containing the document, when the document was last modified, the person that last modified that document, the subject matter of the document, and/or other document information. The flexible-data columns are flexible in that the user may use the same column for presenting different data and/or data in a different format (e.g., the user can change the format of the data in a flexible-data column from textual to graphical and/or make other changes to the data). In this specification, the term document refers to a collection of data that is grouped together as a single entity. The term document is generic to a file, a folder, a webpage, a collection of webpages, an image, as well as a text-based document. The ability of embodiments to allow a user to change which characteristics are presented to the user can enable the system to be used more easily. In embodiments there are provided techniques for flexibly displaying information into one or more columns. One technique includes the user interface (UI) receiving from an end user a selection of characteristics or display criteria configured by an administrative user. Display criteria are characteristics of a document that are capable of being used to determine the order in which the data is used and/or whether the data is displayed. Data from a dataset may be selected and/or ordered for displaying with the characteristic or according to the criterion selected by the end user. Alternative embodiments may provide displaying positive and negative data, sorting, and fixed locations.

In an embodiment and by way of example, a method for flexible-data column user interface is provided. The method embodiment may include receiving a set of characteristics from a first user, which may have an administrative role. The set of characteristics may be sent to a second user, which may be in an end-user role. The second user may be capable of selecting at least one of the characteristics from the set of characteristics. In response to the selection, the dataset may be displayed to the second user with the selected characteristics. Optionally, the dataset may be sorted into an order that is based on the selected characteristic. In an embodiment, displaying the dataset to the second user based on the selected characteristic, may be performed by at least one of selecting data to be displayed from the dataset according to the characteristic and ordering the data to be displayed according to the characteristic.

While the present invention is described with reference to an embodiment in which techniques for flexible-data column user interface are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for flexible-data column user interface.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. A pick list may allow users to choose what the users would like to see on the page without adding extra clutter to the page. A pick list is a list of one or more items that the user may choose from. For example, the pick list may include a plurality of items and/or may be a pull down menu. The user may choose to sort by this additional data. When a search is performed the column defaults to sorting the list by relevance. The user may sort by other values instead of relevance. Unlike other search engines on the web, the user may return back to "sort by relevance." In an embodiment, the user may choose between a textual or graphical display of data. In an embodiment, the administrator may give flexibility to the user through the front-end UI instead of digging through a setup. In an embodiment, an administrator may control the characteristics that appear in the pick list. The flexible-data column may (optionally) be used in conjunction with a document sharing system.

In an embodiment, selecting a column causes the header to become bold. In an embodiment there may be multiple flexible-data columns. In an embodiment, there are multiple flexible-data columns and the headers of the columns appear as normal text headers. In an embodiment, drop down menus will only appear when the title is either hovered over or clicked upon. In an embodiment, columns, including the flexible-data columns, may be dragged from one location to another.

Next, mechanisms and methods for providing flexible-data column user interface will be described with reference to example embodiments.

System Overview

Figure 1:
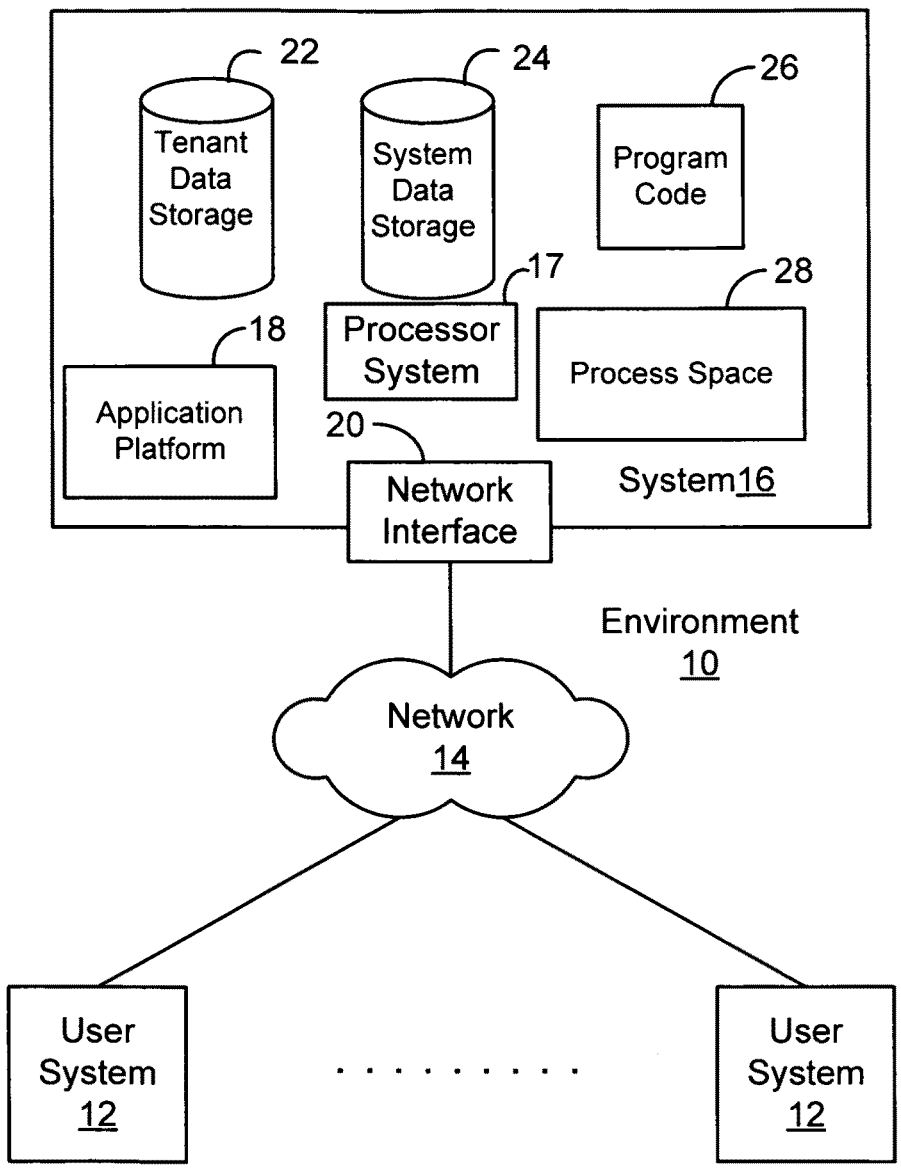
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG.

2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creating, managing, and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages, and other information to and from user systems 12 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used (Java™ is a trademark of Sun Microsystems, Inc.).

According to one embodiment, each system 16 is configured to provide webpages, forms, applications, data, and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
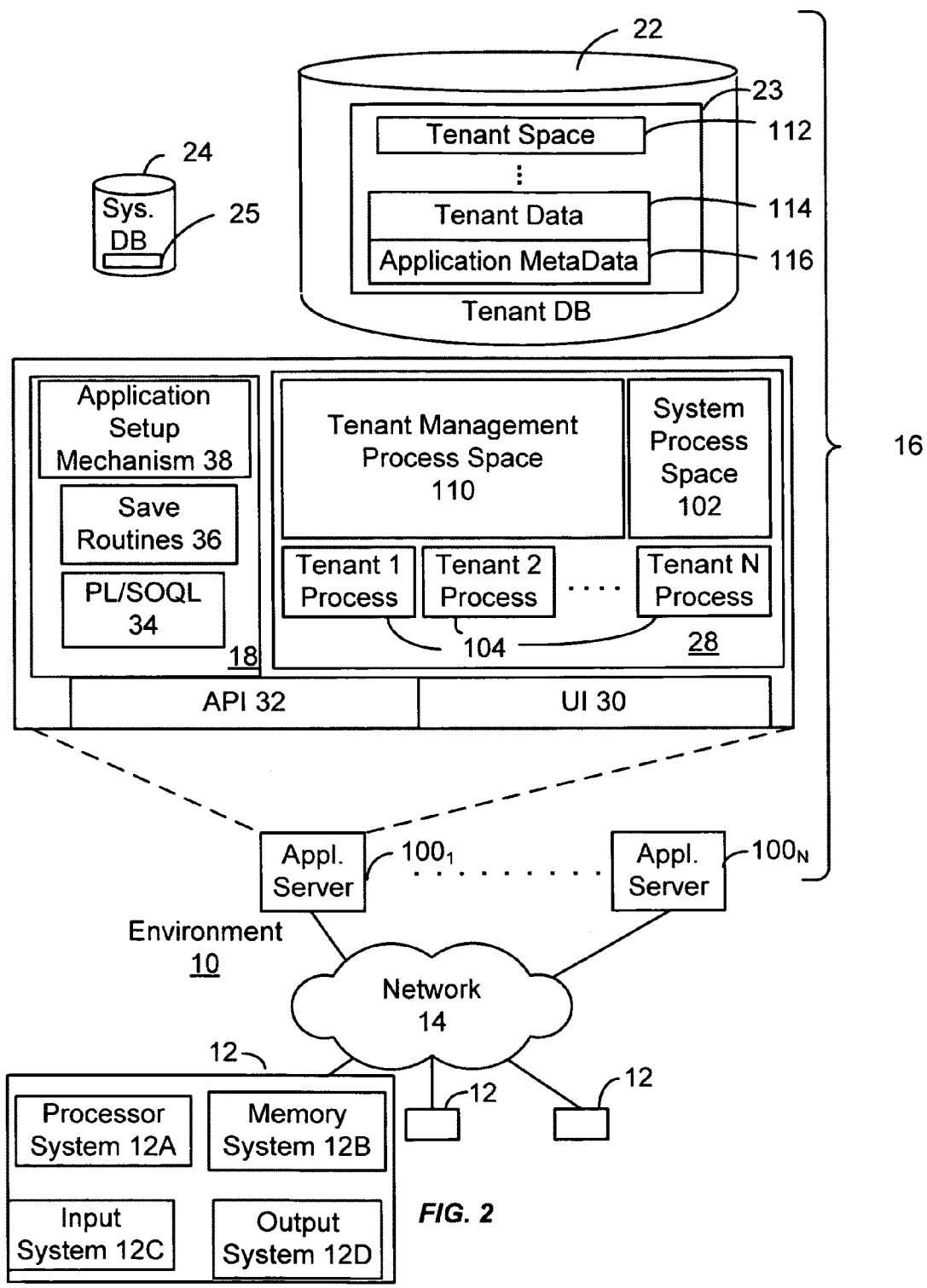
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114, and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3:
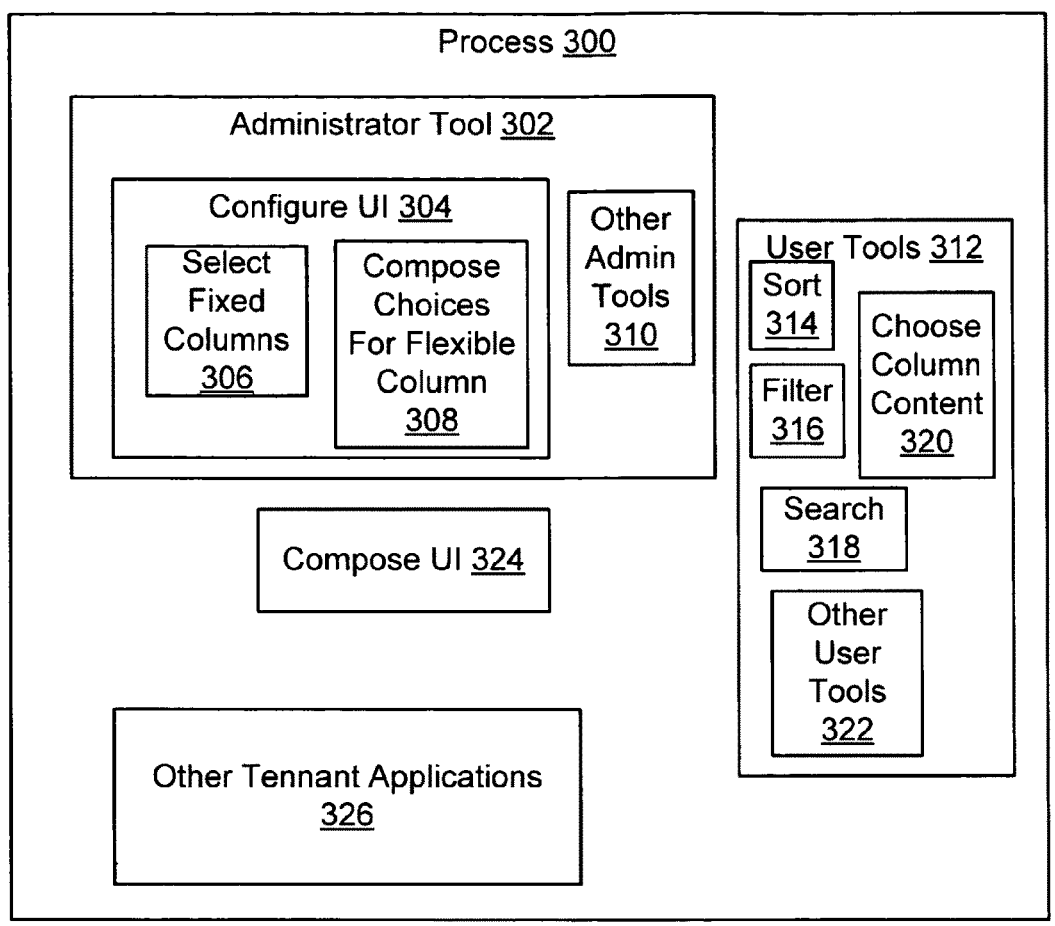
FIG. 3 is a block diagram of an example of a tenant process of FIGS. 1 and 2.

Block Diagram of Tenant Process (FIG. 3)

FIG. 3 is a block diagram of an example of process 300. Process 300 may include administrator tools 302 having configure User Interface (UI) 304, which has select fixed columns 306 and compose column choices 308. Administrator tools 302 also have other admin tools 310. Process 300 also includes user tool 312, which has sort 314, filter 316, search 318, choose column content 320, and other user tools 322. Process 300 may also include compose UI 324 and other tenant applications 326. In other embodiments, process 300 may not have all of the elements listed and/or may have other elements instead of or in addition to those listed.

Process 300 may be an embodiment of one tenant processes 104. Process 300 may include processes for various applications that are tailored for the needs of the corresponding tenant. Administrator tools 302 include various tools that an administrator of the tenant may use to manage the tenant data and end users associated with the tenant.

Configure UI 304 includes tools for configuring the user interface for the end user. Select fixed columns 306 are tools that are used for selecting the characteristics that are listed in the user interface 30, which the end user cannot change, and optionally may be presented in column format. In an embodiment, the data is displayed in columns. For example, one column may have a set of identifiers for documents (e.g., one identifier, such as a title, for each of document), and a set of values for each characteristic may be listed in each of the different columns. Thus, in this embodiment, by selecting the characteristic, the columns that are displayed are chosen. Compose column choices 308 include one or more tools for selecting the criterion that are available to an end user from which the end user may choose. For example, there may be one or more columns for which the end-user may choose the characteristic that the column represents. There may be a menu of characteristics to which the user may set the column, and the administrator may be able to use compose column choices 308 to select the characteristic. Other admin tools 310 may include other administrative tools, such as tools for controlling the nature of the login process or for resetting passwords, downloading or uploading data.

User tools 312 include tools for a user to interact with data associated with the tenant. Sort 314 is a tool that sorts the data according to one of the characteristics selected. The characteristics may be referred to as ordering criteria or just criterion or criteria for short, because the characteristics are used as criteria for ordering the document with the UI. Filter 316 is a tool for selecting a filter to remove data from the list of data displayed based on the characteristics. Search 316 is a tool for searching for data meeting a particular criterion, such as having a particular alphanumeric string in the description of the data. Choose column content 318 is a tool via which the user chooses a characteristic from the choices selected by the administrator. For example, if the characteristics are listed in a menu, the user chooses a desired characteristic from the menu. Other user tools 322 are other tools that a user may use for other purposes, such as changing a password, personalizing the user interface, and manipulating data.

Compose UI 324 includes instructions for composing a UI. The instructions may include parameters that are changed to reflect options chosen via administrative tool 302 and/or user tool 312. In an embodiment, the set of instructions in compose UI 324 may be altered depending on the choices made by the administrator and/or user. Other tenant applications 326 may include other applications that the tenant may use.

Screenshots of User Interface (FIGS. 4-7)

Figure 4:
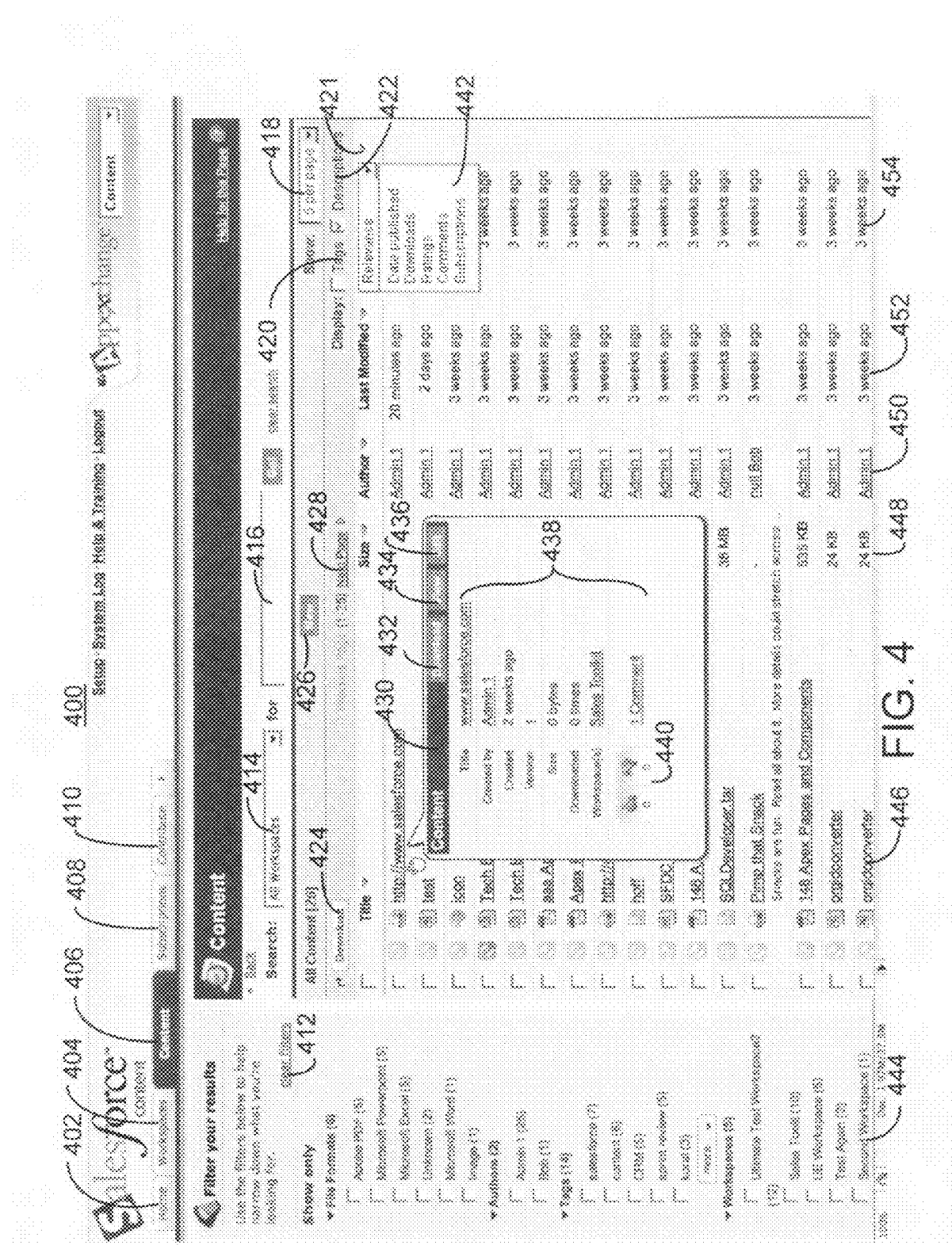
FIG. 4 shows a screenshot of an embodiment of a webpage of a User Interface (UI) that has a flexible-data column.

FIG. 4 shows an embodiment of a webpage 400 of a UI having a flexible-data column. Webpage 400 may include home tab 402, workspaces tab 404, content tab 406, subscription tab 408, contribute tab 410, clear filters 412, search fields window 414, search term window 416, show 418, tags 420, description 422, download 424, new 426, next page 428, hover window 430, download 432, view 434, edit 436, meta data 438, votes 440, pull down menu 442, filter 444, identifiers 446, first characteristic 448, second characteristic 450, third characteristic 452, and flexible characteristic 454. In other embodiments, webpage 400 may not have all of the elements listed and/or may have other elements instead of or in addition to those listed.

Webpage 400 is for viewing the portion of the content in an online database that is relevant to the tenant. Webpage 400 may be part of UI 30. In an embodiment, webpage 400 may be created by compose UI 324. Home tab 402 is the main page for webpage 400. Home tab 402 may be a link that brings the user to a webpage that has links to other parts of the website that are expected to be of particular interest and that are commonly accessed. Home tab 402 may contain a variety of windows from which information about various functions that are provided by the website may be monitored and altered. In an embodiment, each tenant and/or user may personalize the home page to include the features (e.g., widgets, links, windows, and/or views) that the users desire and/or that the tenant desires.

Workspaces tab 404 is a link to a workspaces webpage associated with the website and/or the portion of the database relevant to the tenant. A workspace is a location where files are stored and where users may share work with one another. Each workspace has membership, which is a group of users that are allowed to access the workspace. Each member may be assigned a certain level of access. For example, once a member is added, the administrator for the workspace (e.g., a workspace administrator) may assign or may be required to assign an access level. The types of activities and the types of items that are permitted by a given access level may be set by an administrator for organization (e.g., an organizational administrator). In an embodiment, the workspace administrator and organizational administrator may be different roles or different features of different roles that may be assigned to different people.

Content tab 406 is a tab that brings the user to the current webpage (a content webpage), which is displayed in FIG. 4. In FIG. 4 content tab 406 is currently selected. The content webpage allows the user to organize, share, search, and manage content within the user's organization and across different areas of the multitenant database. The content webpage may handle a variety of file types, including traditional business documents, such as Microsoft Power-Point® presentations, audio files, video files, and webpages. In an embodiment, the content webpage allows users to tag, rate, comment, and subscribe to content.

Subscriptions 408 brings the user to a page that allows the user to view and/or alter subscriptions. Subscriptions are information that is forwarded to the user periodically and/or every time a particular event occurs. For example, a user may have a type of subscription to an article such that (as a result of the subscription) every time the article is updated, the user receives an email notification. Contribute tab 410 may bring the user to a webpage (e.g., a content detail page) that allows the user to make contributions by uploading a document.

Clear filter 412 is a link that causes any filters that are set to be cleared. Filters remove some of the data from the data that is displayed by restricting the data being displayed to contain certain specified characteristics. Search fields window 414 allows the user to select a field to which the search will be limited. In an embodiment, search fields window 414 is associated with a pull down menu that lists the workspaces and/or combinations of workspaces to which the user has access and is allowed to search. Selecting one of the menu items causes the name, description, or identifier to appear in search fields window 414, and the search will be limited to the workspace or combination of workspaces that is identified in search fields window 414. Search term windows 416 allows the user to enter a string of alphanumeric characters. Upon initiating the search, a search will be conducted within the workspaces indicated in search fields window 414 for documents having the alphanumeric string that is in search term window 416. In other embodiments, there may be other search features present and/or there may be basic search and an advanced search having more features and fields that can be searched.

Show 418 lists the number of documents that the user wants to be displayed on a given page. If the number is large enough the user will not be able to see the entire page of data simultaneously on one screen. Tags 420 is a box which when selected causes a list of the tags associated with a particular document to be listed under the document. Similarly, when tags 420 is not selected, the tags do not appear under the title of the document. Sort icon 421 is optional, and may be placed next a flexible-data column or other column. When turned off, sort icon 421 displays as a gray triangle. In an embodiment, when a user wishes to sort by the values currently listed, the user clicks on (or selects) sort icon 421, and sort icon 421 turns yellow to indicate the sort. In other embodiments, sort icon 421 may have other shapes, such as arrows, squares, or circles. In other embodiments, sort icon 421 may have other colors indicating whether the data is sorted based on the characteristic associated with sort icon 421. In an embodiment, none of the sort icons are gray, clicking on title of a column activates sort icon 421 (sorting the documents in the order of the values of the characteristic of that column on), and sort icon always has the same color (e.g., yellow), for example.

Description 422 is a box that allows the user to select whether a description of each document appears in association with each document (e.g., directly under the title of each document). Download 424 is a link that causes a selected document to be downloaded. New 426 is a link that causes the user to be brought to a webpage for uploading new documents or adding new documents to a workspace. For example, new 426 may bring the user to the same page that contribute tab 410 brings the user. Next page 428 is a link that causes the next page of the list of document to be displayed.

Hover box 430 is a box of information that appears when the user hovers the mouse over and/or near the title of a document. Hover box 430 may include download link 432, view link 434, and edit link 436, which allow the user to download, view, and edit the document displayed in hover box 430, respectively. Meta data 438 is meta data related to the document displayed in hover box 430. For example, meta data 438 may include the author of the document, an indication of when the document was created, a version number, an indication of the size of the document, an indication of how many times the document was downloaded, a listing of one or more workspaces where the document is located, and/or the number of comments. Votes 440 list the number of users that voted for or against the document. The number of votes listed may be the actual number of votes the document received or some votes may be given more weight than others. If some votes are given more weight than others, then votes 440 is a score indicative of the number of votes received.

Pull down menu 442 is a list of characteristics of the documents. Selecting a particular menu item on pull down menu 442 causes the value or a graphical representation of the value for that characteristic to appear in the column associated with pull down menu 442. Although in FIG. 4 only one column has a pull down menu, and all other columns are fixed, in other embodiments any combination of, or all of, the columns of FIG. 4 may have pull down menus for choosing the characteristic displayed in the corresponding column. In an embodiment, pull down menu 442 only appears when the title or column is hovered over. In another embodiment, only when there are multiple flexible-data columns, pull down menu 442 appears when the title or column is hovered over, but when there is only one flexible-data column, pull down menu is always present.

Filters 444 are a list of filters that may used to reduce the number of documents displayed on webpage 400. The filters may be grouped according to type and may have check boxes for indicating which filters are selected. For example, the categories of filters may be file format, authors, tags, and/or workspaces. The category file format may list different file formats, which may correspond to the applications that created the file. Some file formats that may be included in filters 444 are Microsoft Word®, Novel WordPerfect®, Microsoft Excel®, Microsoft Power Point®, Adobe® PDF, JPEG, Bitmap, Text, Image, and/or Unknown. The author filters may list authors of documents, which may be a list of every author that is listed in a group of documents that make up the dataset and/or may be a list of all users that are authorized to be authors. Under the category tags, there may be a list of all tags that are in use within the set of documents. Under the category workspaces there may be a list of all workspaces that exist for sharing documents. Next to each filter there may be a number listed that indicates the number of documents that have the characteristic that is associated with the filter. Selecting multiple filters will limit the documents displayed to those documents that have all of the characteristics associated with each of the filters selected.

Identifiers 446 is a column that lists the titles (or other identifiers, such as filename) of the documents listed. In an embodiment, a description of the document appears below the title if description 422 is selected. In an embodiment, tags appear below the title if tags 420 is selected.

First characteristic 448, second characteristic 450, and third characteristics 452 are examples of fixed characteristics chosen by the administrator, which the user cannot change in the example of FIG. 4. Also, in the example of FIG. 4, first characteristic 448 is the size of the document, second characteristic is the author of the document, and third characteristic 452 is an indication of when the document was last modified (e.g., one minute ago, a day ago, three weeks ago).

Flexible characteristic 454 is a characteristic that the end-user may choose by selecting one of the menu items in pull down menu 442 (or in another pick list). In the example of FIG. 4, flexible characteristics currently lists the last modified characteristic indicating when the document was last modified. In the example of FIG. 4, using pull down menu 442, the end-user could change the characteristic to date published, downloads, or subscriptions. Optional sort icon 421 may be used to sort the dataset based on the characteristic selected via pull down menu 442. For example, the dataset may be sorted such that the characteristic is in ascending order or descending order. If the characteristic has alphabetical values, the dataset may be sorted such that the characteristic is in alphabetical or reverse alphabetical order. In an embodiment, the text in flexible-data column 454 and/or the title for 454 is made to be bold when flexible-data column 454 is selected, but at other times the text has its normal font. In an embodiment, the color and shading of the column do not change when flexible-data column 454 is selected.

Figure 5:
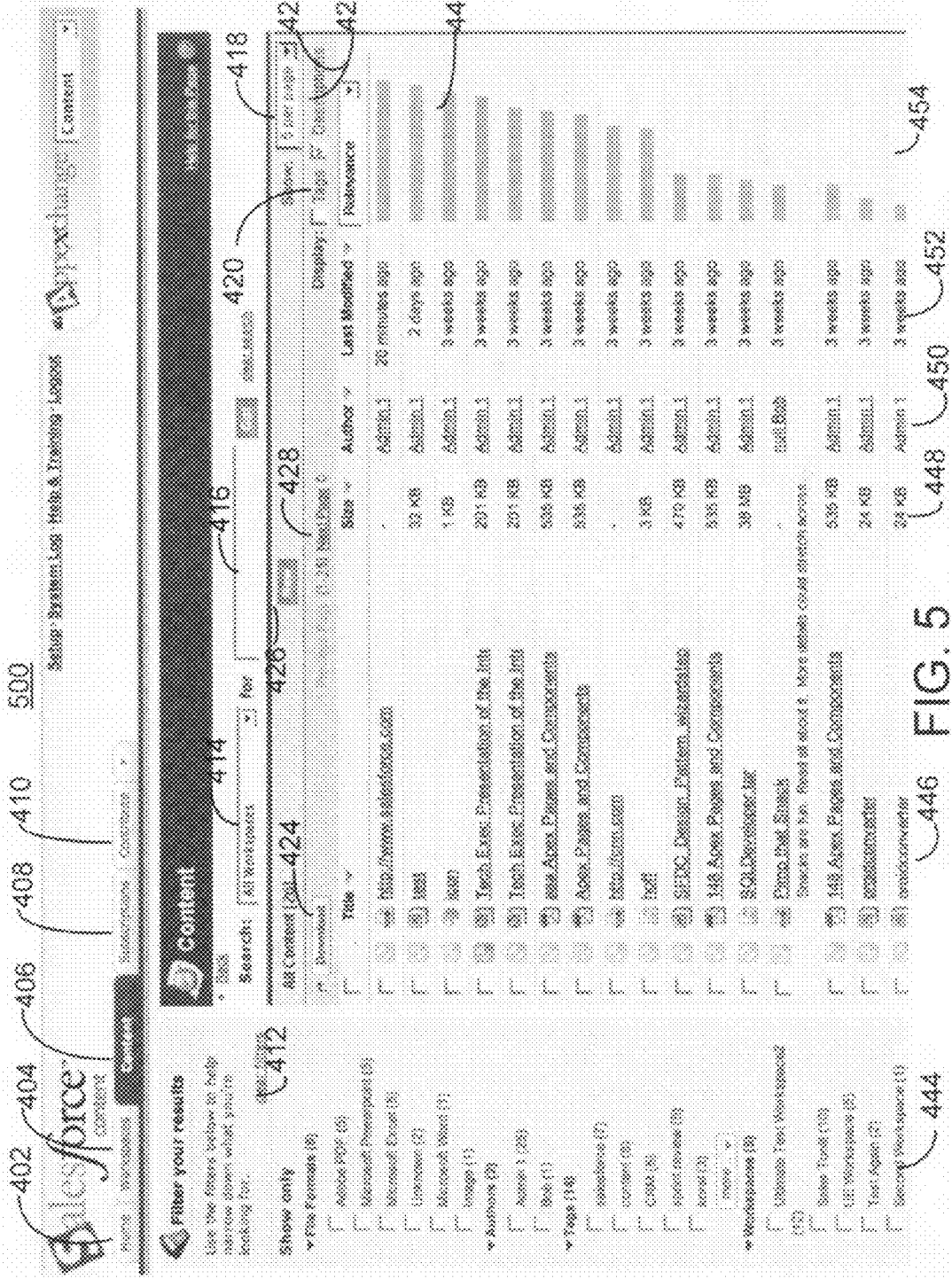
FIG. 5 shows a screenshot of an embodiment of another webpage of the UI of FIG. 4 that also has a flexible-data column.

FIG. 5 shows an example of a webpage 500 that has a flexible-data column. Webpage 500 includes home tab 402, workspaces tab 404, content tab 406, subscription tab 408, contribute tab 410, clear filters 412, search fields window 414, search term window 416, show 418, tags 420, sort icon 421, description 422, download 424, new 426, next page 428, pull down menu 442, filter 444, identifiers 446, first characteristic 448, second characteristic 450, third characteristic 452, and flexible characteristic 454. In other embodiments, Webpage 500 may not have all of the elements listed and/or may have other elements instead of or in addition to those listed.

Webpage 400, home tab 402, workspaces tab 404, content tab 406, subscription tab 408, contribute tab 410, clear filters 412, search fields window 414, search term window 416, show 418, tags 420, sort icon 421, description 422, download 424, new 426, next page 428, pull down menu 442, filter 444, identifiers 446, first characteristic 448, second characteristic 450, third characteristic 452, and flexible characteristic 454 were discussed above in conjunction with FIG. 4. Similar to webpage 400, webpage 500 may be part of UI 30.

Webpage 500 differs from webpage 400 (FIG. 4) in that hover box 430 is absent and flexible field 454 includes graphical content (instead of alphanumerical content). In the example of FIG. 5, the graphical content of flexible characteristic 454 is a bar graph, or a set of bars in which the length of each bar represents the relative value of the characteristic for the document in the same row. The longer the bar, the greater the value of the characteristic associated with the bar. In the example of FIG. 5, flexible characteristic 454 is set to relevance and the longer the bar associated with a document, the greater the relevance of the document. In an embodiment, other types of graphical content may be included in addition to or instead of bars. For example, the graphical content may be stars, circles, or other graphical content.

Figure 6A:
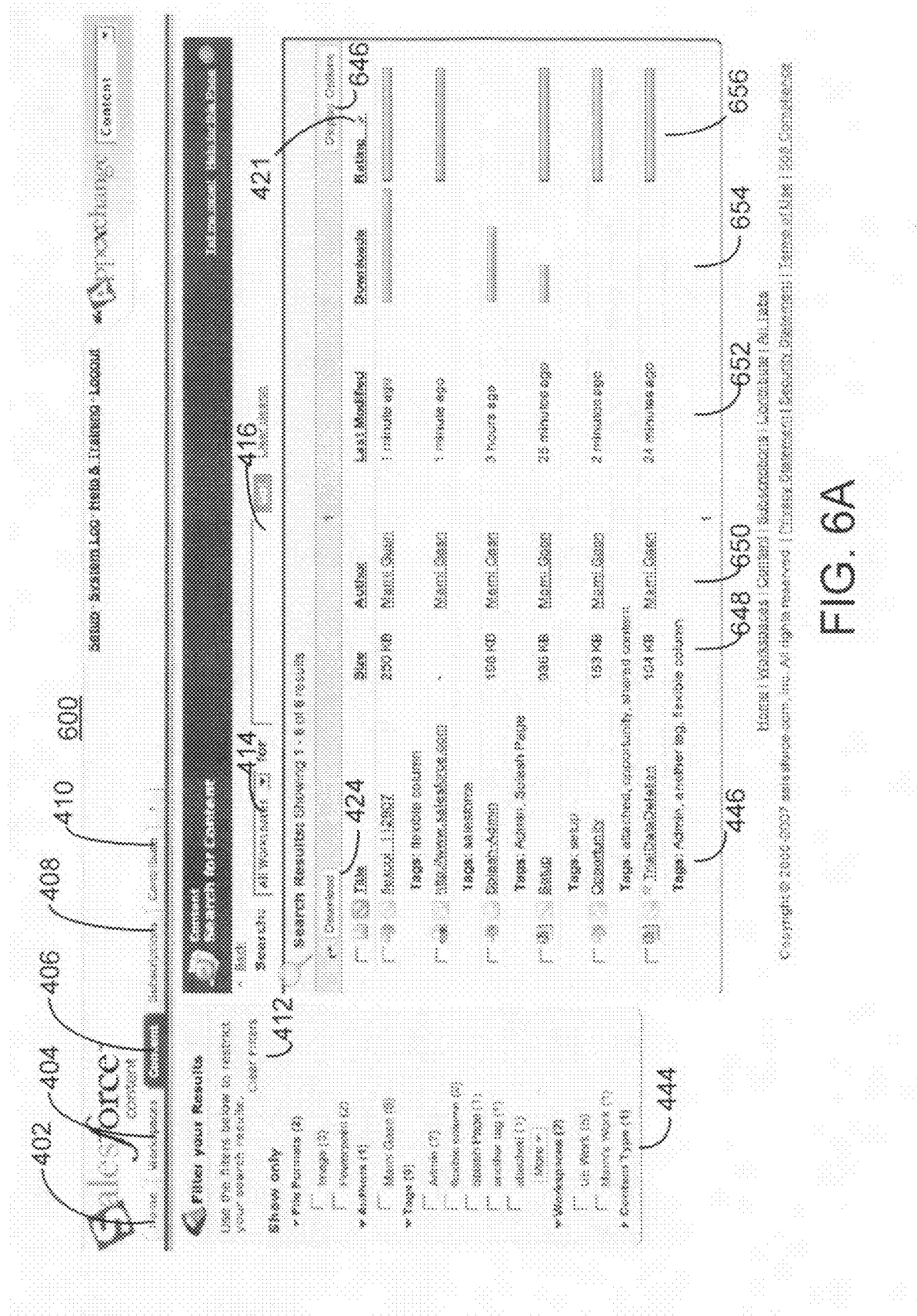
FIG. 6A shows a screenshot of a webpage of another embodiment of the UI.

FIG. 6A shows another embodiment of a webpage 600. Webpage 600 includes home tab 402, workspaces tab 404, content tab 406, subscription tab 408, contribute tab 410, clear filters 412, search fields window 414, search term window 416, sort icon 421, download 424, filter 444, identifiers 446, display options 646, first characteristic 648, second characteristic 650, third characteristic 652, and fourth characteristic 654. In other embodiments, webpage 600 may not have all of the elements listed and/or may have other elements instead of or in addition to those listed.

Home tab 402, workspaces tab 404, content tab 406, subscription tab 408, contribute tab 410, clear filters 412, search fields window 414, search term window 416, show 418, sort icon 421, download 424, filter 444, and identifiers 446 were discussed above in conjunction with FIG. 4. Similar to webpage 400, webpage 600 may be part of UI 30.

Display options 646 allow the user to choose whether to view the tags and/or descriptions of each document. Display options 646 may also allow the user to choose which characteristics are listed in each column and/or may allow the user to choose other options. First characteristic 648, second characteristic 650, third characteristic 652, and fourth characteristic 654 are similar to first characteristic 448, second characteristic 450, third characteristic 452, and flexible characteristic 454. However, first characteristic 648, second characteristic 650, third characteristic 652, and fourth characteristic 654 may be changed by the end-user even though no pull down menus are associated with the corresponding columns. The manner in which the characteristics that are displayed may be changed is described in conjunction with FIG. 6B. In the example of FIG. 6A fourth characteristic 654 has different graphical representations for positive and negative values of data. Specifically, fourth characteristic 654 uses one color bar for positive votes (e.g., green) and another color for positive votes (e.g., red). In another embodiment, different shadings or cross hatchings may be used for negative and positive votes. Although graphical content having different types of representations for negative and positive data is only illustrated in FIG. 6A, graphical content with different representations of negative and positive data may be used in conjunction with FIGS. 4 and 5, above or FIGS. 7A and B, which will be discussed below.

Figure 6B:
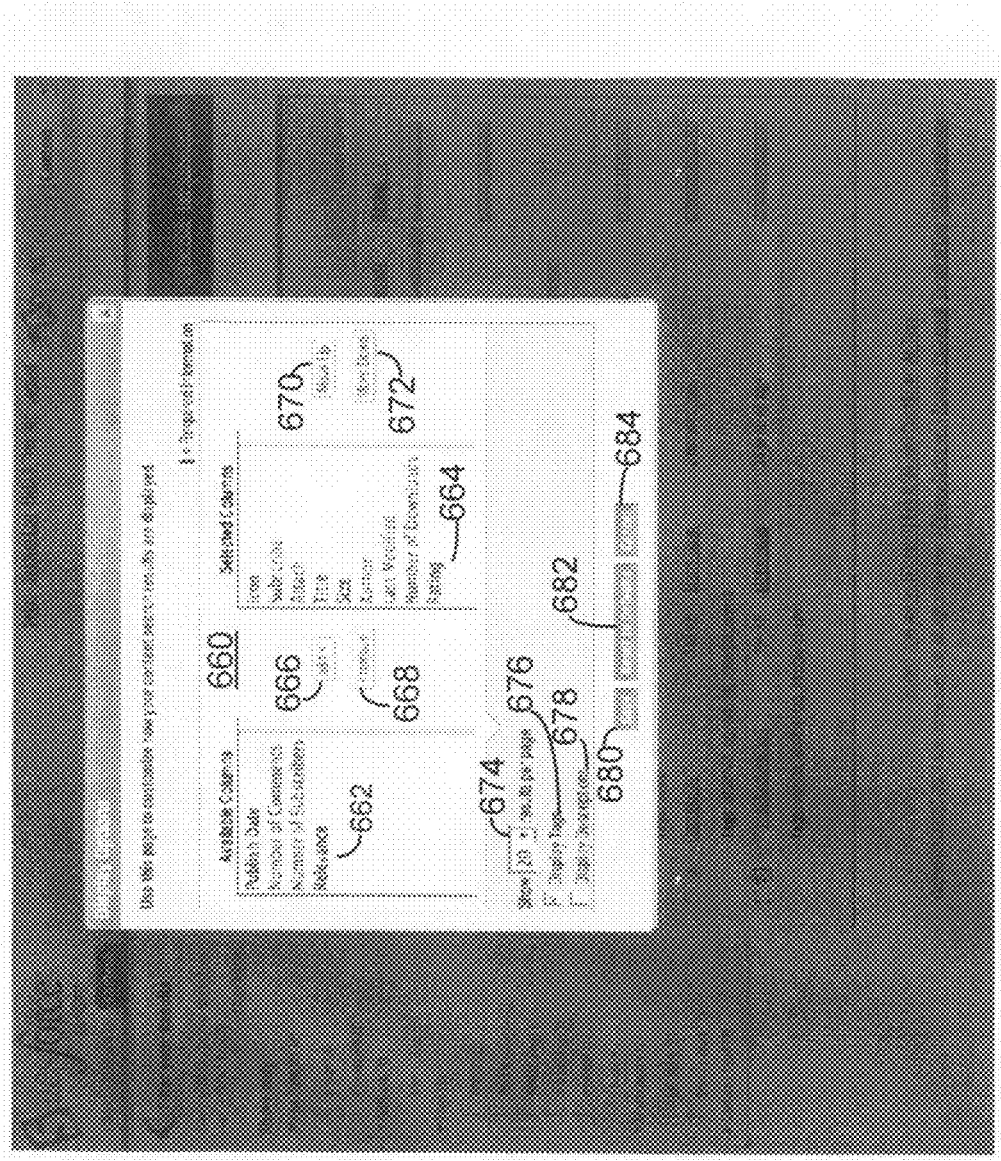
FIG. 6B shows a screenshot of an embodiment of a display options box associated with the UI of FIG. 6A.

FIG. 6B shows an embodiment of display options box 660. Display options box 660 may include available columns 662, selected columns 664, add 666, remove 668, move up 670, move down 672, show results 674, display tags 676, display description 678, save 680, reset defaults 682, and cancel 684. In other embodiments, display options box 660 may not have all of the elements listed and/or may have other elements instead of or in addition to those listed.

Display options box 660 may be used to change display options, such as which characteristics are displayed and whether or not the tags and/or descriptions are displayed. Selecting display options 646 (FIG. 6A) opens display options box 660. Available columns 662 lists the available characteristics that may be selected, but that have not yet been selected. Selected columns 664 lists the columns that have been selected. Add 666 may be used for moving a characteristic from the available columns 662 to selected columns 664, thereby selecting the characteristics associated with that column. In an embodiment, first the user selects one of the characteristics listed in available columns 662, and then selects add 666, which causes the selected characteristic to move from available columns 662 to selected columns 664. Similarly, remove 668 may be used for moving a characteristic from the selected columns 664 to available columns 662. In an embodiment, first the user selects one of the characteristics listed in selected columns 664, and then selects remove 668, which causes the selected characteristic to move from selected columns 664 to available columns 664.

Move up 670 may be used to move a selected one of selected characteristics 664 up one position in the list of characteristics in selected characteristics 664. Move down 672 may be used to move a selected one of selected characteristics 664 down one position in the list of characteristics in selected characteristics 664. Move up 670 and move down 672 may be used to rearrange the order in which the characteristics listed in selected characteristics 664. The order in which the characteristics are listed in selected characteristics 664 corresponds to the order in which the characteristics appear in webpage 600 as a result of creating a list of selected characters via display options box 660. Show results 674, display tags 676, display description 678 have the same functions as show 418, tags 420, description 422, respectively, which was described in conjunction with FIG. 4. Selecting save 680 causes the display options chosen to be saved. Reset defaults 682 changes the display options back to the default display options. Cancel 684 cancels the changes made in the current sessions.

Figure 7A:
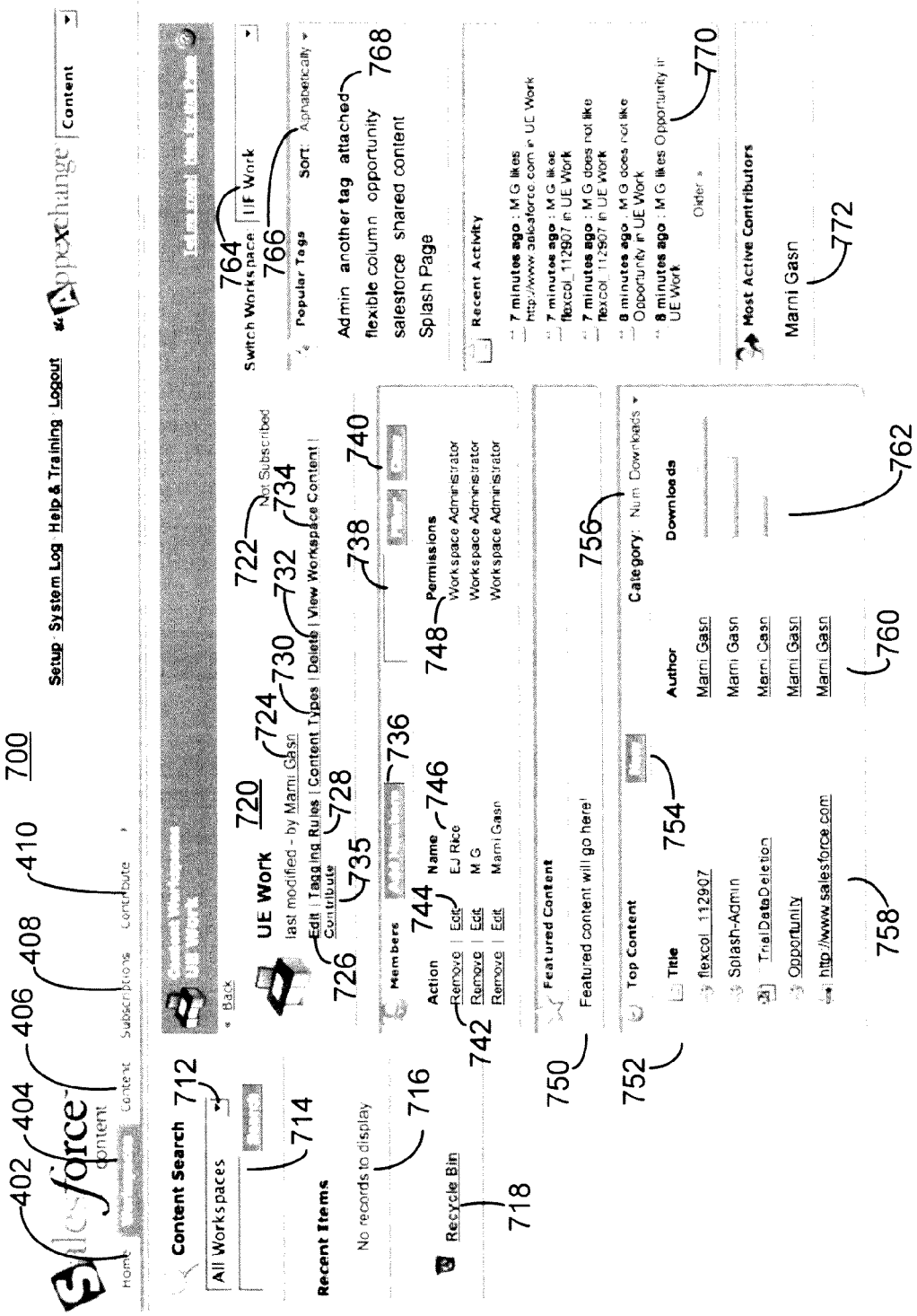
FIG. 7A shows a screenshot of an example of a webpage of a UI having a workspace page with a flexible-data column.

FIG. 7A shows an example of a workspace page 700 having a flexible-data column. Workspace page 700 may include home tab 402, workspaces tab 404, content tab 406, subscription tab 408, contribute tab 410, search field window 712, search term window 714, recent items 716, recycle bin 718, current workspace 720, subscription status 722, last-modified-by 724, edit 726, tagging rules 728, content type 730, delete 732, view workspace content 734, contribute 735, add member 736, filter 738, clear 740, remove 742, edit 744, name 746, permission 748, featured articles 750, top content 752, new 754, category 756, identifier 758, author 760, flexible characteristic 762, switch workspace 764, sort 766, tags 768, recent activity 770, and most active contributor 772. In other embodiments, workspace page 700 may not have all of the elements listed and/or may have other elements instead of or in addition to those listed.

Home tab 402, workspaces tab 404, content tab 406, subscription tab 408, and contribute tab 410 were discussed in conjunction with FIG. 4, above. Search field window 712 and search term window 714 have the same functions as search fields window 414 and search term window 416. Recent items 716 list the items that were recently modified or added. Recycle bin 718 stores items that have been deleted. Workspace page 700 may be a webpage from UI 30. Current workspace 720 lists information about a current workspace. Subscription status 722 indicates whether the user is subscribed to the current workspace. Last-modified-by 724 list the person that last modified the workspace. Edit 726 allows the user to edit properties of the workspace. Tagging rules 728 allows the administrator to establish rules for limiting the tags that may be established and/or for suggesting tags to attach to a document. In an embodiment, one tagging rule may be to allow users to enter any tag when contributing content or editing content details. Another tagging rule may be to allow users to choose from a recommended set of tags provided by the administrator and/or to enter their own tags when contributing content or editing content details. Another tagging rule may allow a user to only choose from the tags that the administrator provides when contributing content or editing content details.

Content type 730 allows the user to specify or change the content type of a workspace. Delete 732 deletes a workspace. View workspace content 734 allows the user to view the content of the particular workspace. Contribute 735 allows the user to add a document to a workspace. Add member 736 allows an administrator to add a member to the workspace. Filter 738 allows the user to enter an alphanumeric string that may filter the data listed, so that only those documents having the alphanumeric string within the current workspace are listed. Clear 740 clears the alphanumeric string from the filter 738. Remove 742 allows a user to remove a member form the workspace. Edit 744 allows an administrator to change the level of access granted to a member or edit other information about the member. Name 746 is the name of the member. Permission 748 is the level of access to the current workspace granted to the corresponding member. Featured articles 750 is a location where an administrator may post a document for others to look at.

Featured article 750 allows the administrator or another user having an appropriate level of access to bring attention to articles that do not have a high relevancy or high number of votes, but that the administrator or other user feels should be reviewed anyway. In an embodiment, top content 752 lists articles that have the highest relevancy. If no workspace is specified, top content lists the articles that have the highest relevance regardless of which workspace the document is associated with. New 754 allows the user to add a document to the current workspace. Category 756 allows the user to select a characteristic that will appear in the flexible-data column. As a result of changing category 756, the default for determining top content 752 changes. As a default, top content 752 lists the documents that have the highest value for the characteristic listed in category 756. Identifier 758 identifies a document. For example, identifier 758 may be a file name or the title of a document. Author 760 is the author of the article. Flexible characteristic 762 is the column that has the characteristic listed in category 756. Switch workspace 764 allows the user to switch to viewing a different workspace than currently being viewed. In an embodiment, selecting a workspace from a drop down menu associated with switch workspace 764 may change the workspace and may cause another workspace to be shown on workspace page 700. Sort 766 is a list of different criterion according to which tags may be sorted. For example, tags may be sorted so that the tags are listed alphabetically, listed in order of popularity, or listed in reverse order of popularity.

Tags 768 is a list of tags associated with different documents. Tags 768 are tags that are associated with or added to different documents. Tags 768 may be used for limiting the document that needs to be searched. Tags 768 may be keywords or phrases that one interested in finding a particular document is likely to associate with that documents. Tags 768 tag the documents. Tags 768 may be added by the user upon uploading and/or publishing documents, and may be used as search parameters. The values of tags 768 may be used as values of keys in a database. Using tags 768 may reduce the number of documents that need to be searched, because only documents having the tag values of interest need to be searched.

Recent activity 770 lists recent activities of the user, such as which documents have been accessed, how long ago the documents have been accessed, and the person that accessed documents. Most active contributor 772 lists the contributor that makes the most contributions.

Figure 7B:
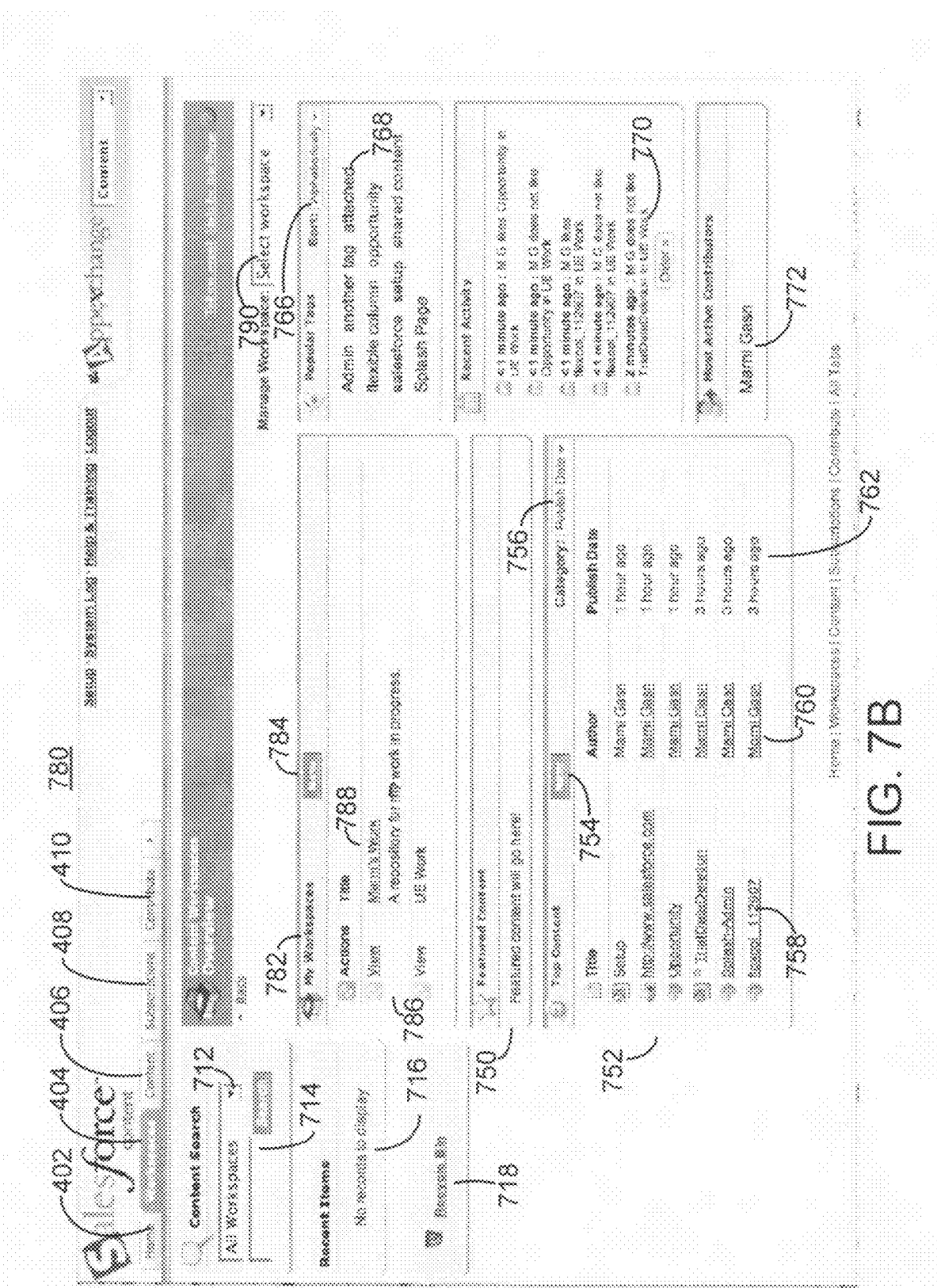
FIG. 7B shows a screenshot of an example of another webpage of a UI also having a workspace page with a flexible-data column.

FIG. 7B shows an example a workspace page 780 that also has a flexible-data column. Workspace page 780 may include home tab 402, workspaces tab 404, content tab 406, subscription tab 408, and contribute tab 410, search field window 712, search term window 714, recent items 716, recycle bin 718, featured articles 750, top content 752, new 754, category 756, identifier 758, author 760, flexible characteristic 762, sort 766, tags 768, recent activity 770, most active contributor 772, my workspaces 782, new 784, actions 786, title 788, and manage workspace 790. In other embodiments, workspaces page 780 may not have all of the elements listed and/or may have other elements instead of or in addition to those listed.

Home tab 402, workspaces tab 404, content tab 406, subscription tab 408, and contribute tab 410 were described in conjunction with FIG. 4, above. Search field window 712, search term window 714, recent items 716, recycle bin 718, featured articles 750, top content 752, new 754, category 756, identifier 758, author 760, flexible characteristic 762, sort 766, tags 768, recent activity 770, and most active contributor 772 were described in conjunction with FIG. 7A, above. However, in FIG. 7B flexible characteristic 762 has text values instead of graphical values. Workspace page 780 may be a webpage from UI 30.

Selecting one of the workspaces listed in my workspaces page 780 causes workspaces page 700 to be displayed. Workspaces page 780 may be reached from workspaces page 700 by selecting manage workspaces from switch workspaces 764 (FIG. 7A). My workspaces page 782 lists workspaces available to the user. New 784 allows an administrator or user to add and/or create a workspace if the administrator or user as the authority to add the workspace. Selecting and clicking on new 784 opens a webpage that has fields for entering information about the new workspace. Actions 786 lists actions that the user is authorized to perform on the corresponding workspace. Some examples of actions are editing or viewing the workspace. In the example of workspace page 780, the only action listed is view, which allows the user to view the workspaces. In an embodiment, other types of actions may be listed, such as edit, or add users. Title 788 lists titles of workspaces to which the user has access. Manage workspace 790 is a pick list of workspaces that may be managed or altered via workspaces page 780. Manage workspace 790 may allow the user to choose a workspace from the pick list and allow those users with the proper permissions level to make changes to the workspace. Selecting a workspace from the menu may bring the user to a page that gives details about that workspace. The embodiments of FIGS. 6A, 6B, 7A, and 7B may be used together.

Figure 8:
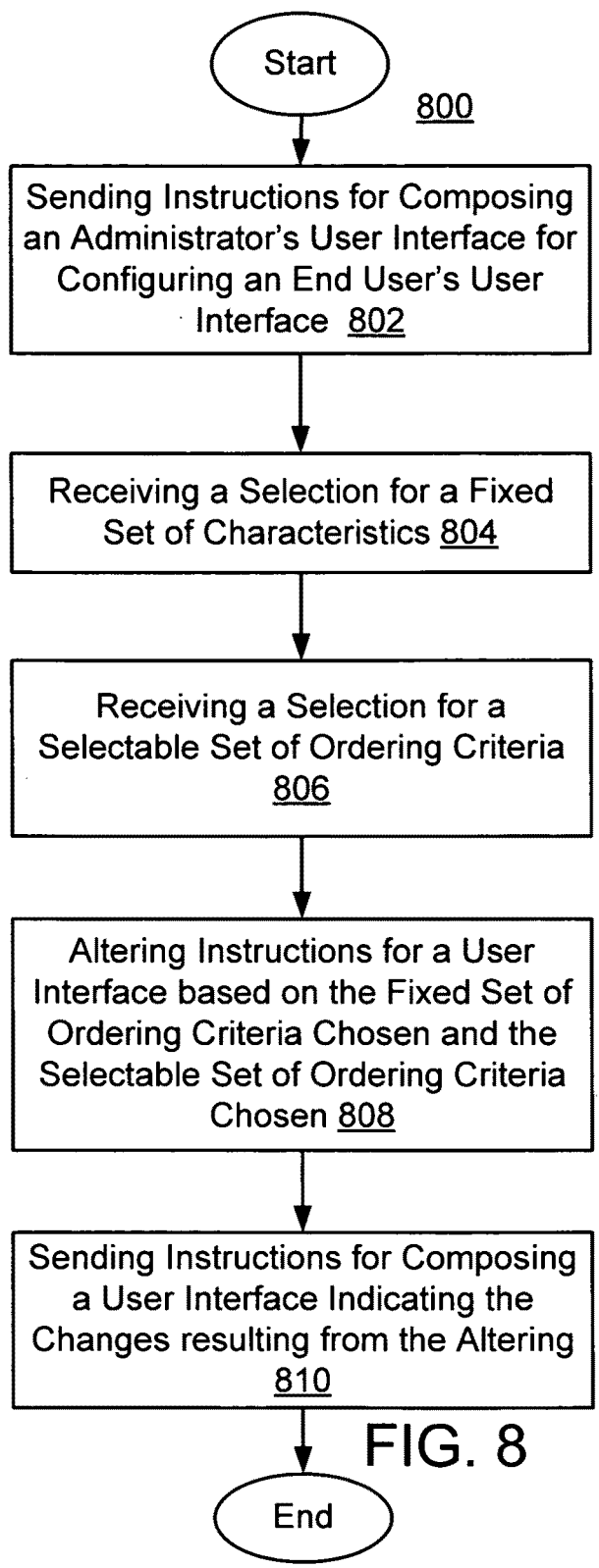
FIG. 8 shows a flowchart of an embodiment of a server-side method for setting up flexible characteristics.

Server-Side Method for Administrator to Set Up the Flexible Characteristics (FIG. 8)

FIG. 8 shows an embodiment of a server-side method 800 for setting up flexible characteristics. Method 800 is implemented by a server while an administrator is setting up the flexible characteristics. In step 802, the server sends instructions for composing a UI via which an administrator may configure an end user's UI, which includes tools for configuring the flexible characteristic. In step 804, the server receives instructions, from an administrator, including choices for a fixed set of characteristics. For example, the server may receive instructions that first characteristic 448 should be size, second characteristic 450 should be author, and third characteristic 452 should be last modified. In step 806, the server may receive a set of characteristics that the user may choose from, and to which the flexible characteristic may be set. For example, server may receive instructions to place within pull down menu 442 a particular list of characteristics as menu items, such as relevance, date published, author, downloads, ratings, comments, last modified, and subscriptions. In step 808, in response to steps 804 and 806, the server may alter one or more instructions for a UI based on the fixed set of characteristics chosen and the selectable set of characteristics chosen. The instructions are altered such that when implemented the instructions produce a UI having the fixed characteristics and flexible characteristics chosen by the administrator. In step 810, in response to step 808, one or more instructions are sent from the server for composing a UI that indicates the fixed and flexible characteristics chosen. In an embodiment, each of the steps of method 800 is a distinct step. In another embodiment, although depicted as distinct steps in FIG. 8, step 802-808 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
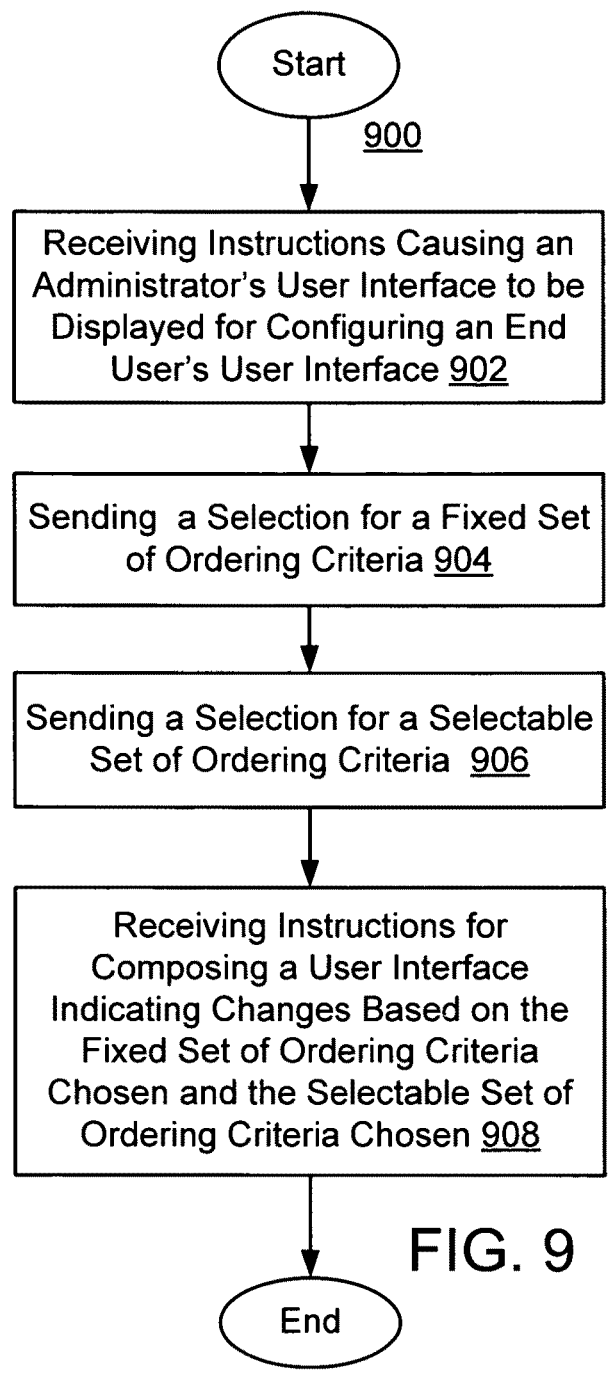
FIG. 9 shows a flowchart of an embodiment of a client-side method for setting up flexible characteristics.

Client-Side Method for an Administrator to Set Up the Flexible Characteristics (FIG. 9)

FIG. 9 shows an embodiment of a client-side method 900 for an administrator to set up flexible characteristics. Method 900 is implemented by a client system of an administrator that is setting up the flexible characteristics.

In step 902, the client system receives instructions for composing a UI, via which an administrator may configure an end user's UI, which includes tools for configuring the flexible characteristic. Step 902 may be performed in response to step 802 (FIG. 8, in step 802, the server sends instructions for composing a UI via which an administrator may configure an end user's UI).

In step 904, the administrator's user system sends one or more instructions to the server, including choices for a fixed set of characteristics. For example, the end-user may send instructions that first characteristic 448 should be size, second characteristic 450 should be author, and third characteristic 452 should be last modified. Step 904 may be performed in response to step 902, and step 804 (FIG. 8) may be performed in response to step 904 (in step 804, the server receives instructions, from an administrator, including choices for a fixed set of characteristics).

In step 906, the client system associated with the administrator may send a set of characteristics that the user may choose from, and to which the flexible characteristic may be set. For example, the administrator may send instructions to place within pull down menu 442 a particular list of characteristics as menu items, such as relevance, date published, author, downloads, ratings, comments, last modified, and subscriptions. In an embodiment step 906 may include sending multiple sets of characteristics (e.g., multiple pull down menus) to the server (for the server to eventually send to the end-user). Step 906 may also be performed in response to step 902, step 806 (FIG. 8) may be performed in response to step 906 (in step 806, the server may receive a set of characteristics that the user may choose from, and to which the flexible characteristic may be set).

In step 908, one or more instructions are received from the server for composing a UI that indicates the fixed and flexible characteristics chosen. Step 908 may be performed in response to step 808 (FIG. 8, in step 808 one or more instructions are sent from the server for composing a UI that indicates the fixed and flexible characteristics chosen). In an embodiment, each of the steps of method 900 is a distinct step. In another embodiment, although depicted as distinct steps in FIG. 9, step 902-908 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
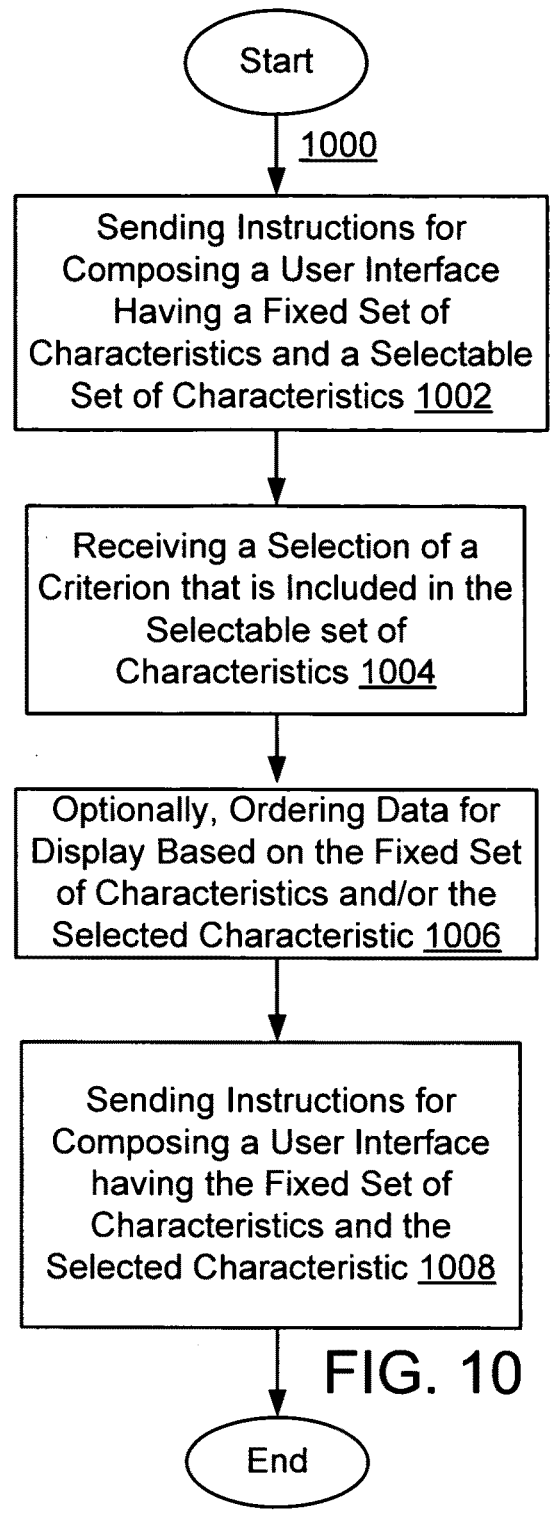
FIG. 10 shows a flowchart of an embodiment of a server-side method for using flexible characteristics.

Server-Side Method for Using the Flexible Characteristics (FIG. 10)

FIG. 10 shows an embodiment of a server-side method 1000 for using flexible characteristics. Method 1000 is implemented by an end-user for choosing a particular characteristic for the flexible characteristic. In step 1002, one or more instructions for composing a UI are sent to a client system. The one or more instructions create a UI that optionally has a fixed set of characteristics. The UI created may also have a selectable set of characteristics. In step 1004, a selection of a characteristic is received. The characteristic selected as a result of step 1004 is one of the selectable set of characteristics that were sent in step 1002.

In optional step 1006, in response to step 1004, data for display is ordered in a particular sequence that is based on the fixed set of characteristics and/or the selected characteristic. In an embodiment, the ordering of the data may occur automatically. In another embodiment, the order of the data is not changed unless the user clicks on the column or on an icon near the column having a characteristic according to which the end-user wants the data to be sorted. In this embodiment, step 1006 includes receiving a selection of the icon prior to the ordering of the data. In an embodiment, as a default, the data is ordered according to relevance, and the more relevant the data, the higher in the list of documents the data appears. In an embodiment, the order of the data is changed from the default only in response to the user requesting the data be sorted according to another criterion, where the request may be in the form of clicking on the column containing that characteristic and/or in response to the user choosing a selection from the set of selectable characteristics. In step 1008, in response to steps 1004 and optionally in response to step 1006, one or more instructions for composing a UI having the fixed set of characteristics and the selected characteristic for the flexible characteristic are sent to the user. In an embodiment, each of the steps of method 1000 is a distinct step. In another embodiment, although depicted as distinct steps in FIG. 10, step 1002-1008 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
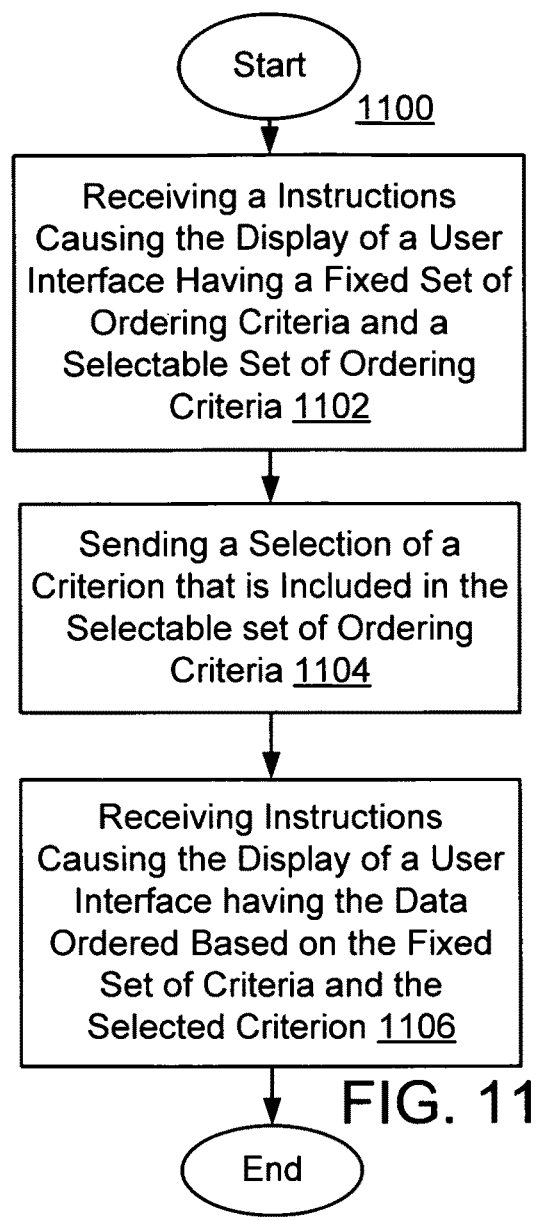
FIG. 11 shows a flowchart of an embodiment of a client-side method for using flexible characteristics.

Client-Side Method for Using the Flexible Characteristics (FIG. 11)

FIG. 11 shows an embodiment of a server-side method 1100 for using flexible characteristics. Method 1100 is a method implemented by an end-user for choosing a particular characteristic for the flexible characteristic. In step 1102, one or more instructions for composing a UI are received at a client system. The one or more instructions create on the user system a UI that optionally has a fixed set of characteristics. The UI created may also have a selectable set of characteristics. Step 1102 may be performed in response to step 1002 (FIG. 10) in step 1002 the one or more instructions for composing the UI are sent). In step 1104, in response to step 1102, a selection of a characteristic that is sent from the user's system to the server. The characteristic selected as a result of step 1104 is one of the selectable set of characteristics that were received in step 1102. Step 1004 (FIG. 10, data for display is ordered into a particular sequence) may be performed in response to step 1104. In step 1106, one or more instructions for composing a UI having the fixed set of characteristics and the selected characteristic for the flexible characteristic are received at the user's system. Optionally, the data is ordered according to the selected characteristic chosen as the flexible characteristic and/or according to a characteristic that the user chose (by, for example, clicking on the column corresponding to that characteristic). Step 1106 may be performed in response to step 1008 (FIG. 10, step 1008 includes sending to the user one or more instructions for composing a UI having the fixed set of characteristics and the selected characteristic). In an embodiment, each of the steps of method 1100 is a distinct step. In another embodiment, although depicted as distinct steps in FIG. 11, step 1102-1106 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Method for Using the Environment of FIGS. 1 and 2

Figure 12:
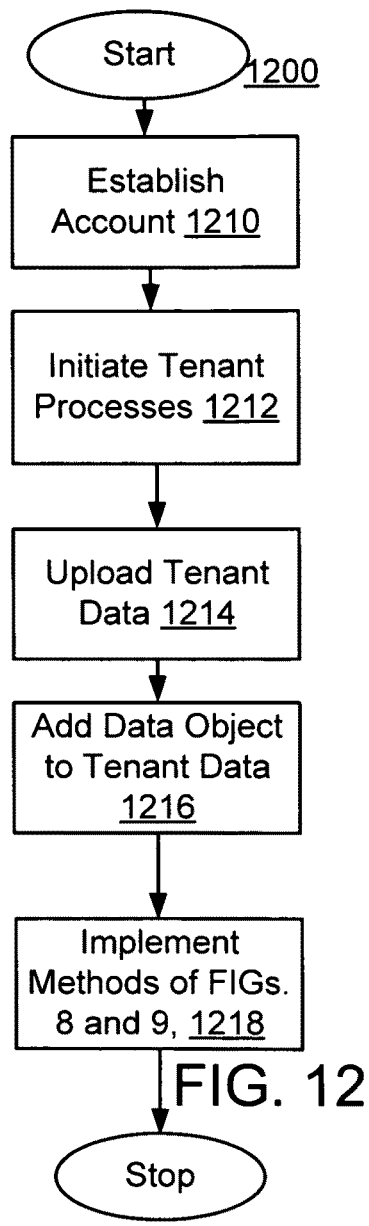
FIG. 12 shows a flowchart of an example of a method of using environment of FIGS. 1 and 2.

FIG. 12 shows a flowchart of an example of a method 1200 of using environment 10. In step 1210, user system 12 (FIGS. 1 and 2) establishes an account. In step 1212, one more tenant process space 104 (FIG. 2) are initiated on behalf of user system 12, which may also involve setting aside space in tenant space 112 (FIG. 2) and tenant data 114 (FIG. 2) for user system 12. Step 1212 may also involve modifying application metadata to accommodate user system 12. In step 1214, user system 12 uploads data. In step 1216, one or more data objects are added to tenant data 114, where the data uploaded is stored. In step 1218, methods 1000 (FIG. 10) and 1100 (FIG. 11) may be implemented. In an embodiment, each of the steps of method 1200 is a distinct step. In another embodiment, although depicted as distinct steps in FIG. 12, step 1210-1218 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

Method for Creating the Environment of FIGS. 1 and 2

Figure 13:
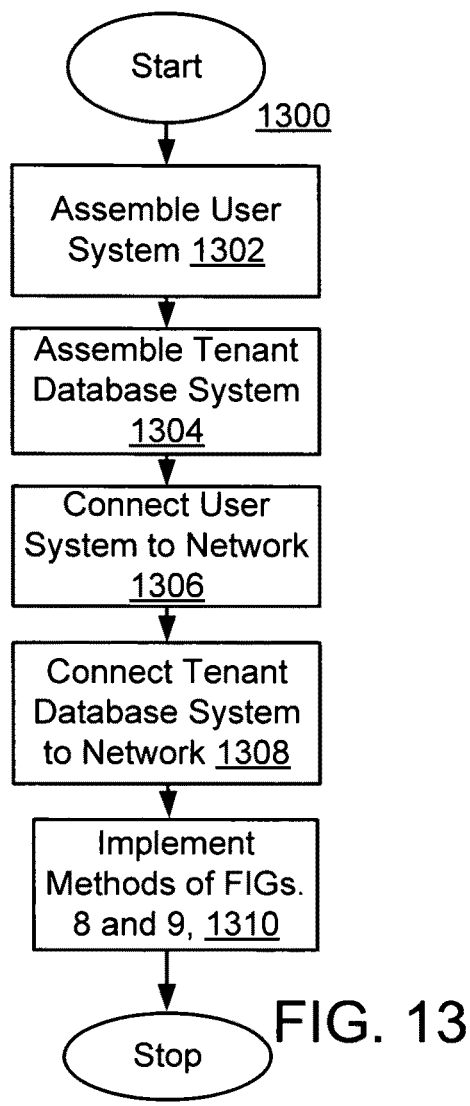
FIG. 13 is an example of method of making the environment of FIGS. 1 and 2.

FIG. 13 is a method of making environment 10, in step 1302, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1304, system 16 (FIGS. 1 and 2) is assembled, which may include communicatively coupling one or more processors, one or more computers, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100₁-100ₙ, system process space 102, tenant process spaces 104, tenant management process space 110, tenant space 112, tenant data 114, and application metadata 116 (FIG. 2).

In step 1306, user system 12 is communicatively coupled to network 104. In step 1308, system 16 is communicatively coupled to network 104 allowing user system 12 and system 16 to communicate with one another (FIG. 2). In step 1310, one or more instructions may be installed in system 16 (e.g., the instructions may be installed on one or more machine readable media, such as computer readable media, therein) and/or system 16 is otherwise configured for performing the steps of methods of FIGS. 3-11. For example, as part of step 1310, one or more instructions may be entered into the memory of system 16 for method 800 (FIG. 8) and method 900 (FIG. 9). In an embodiment, each of the steps of method 1300 is a distinct step. In another embodiment, although depicted as distinct steps in FIG. 13, step 1302-1310 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Extensions and Alternatives

In an alternative embodiment, the user may be notified of a modification of a document in a manner other than receiving an e-mail notification, such as by receiving a popup reminder when accessing the workspace or receiving a copy of the revised document. In an alternative embodiment, content tab 410 may bring the user to a web page that also allows the user to view comments about contributions that the user made. In an alternative embodiment, the contributions that the user may add via contribute tab 410 or via other portions of the webpages of FIGS. 4-7B may be contributions to documents that alter existing documents or articles in addition to being able to add new documents or articles to a workspace. In an embodiment, there may be a pull down menu of activities or other link that may be performed for managing workspaces on workspaces pages 700 or 780, which may facilitate managing the workspaces, such as granting a level of access to the workspace to certain roles.

Each embodiment disclosed herein may be used or otherwise combined with any of the other-embodiments disclosed. Optionally, the color or shading of the column may be changed when flexible-data column 454 or another column is selected. In an embodiment, the embodiments of FIGS. 4, 5, 7A and 7B may be used together. Each embodiment disclosed herein may be used or otherwise combined with any of the other embodiments disclosed. Although not shown in FIGS. 7A and 7B, a sort icon may also be included, which may also be a yellow triangle. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of generating data for display by a user system, comprising:
   receiving a request for a report from a data source;
   generating data for display assembled from the data source responsive to the received request, wherein
      the data for display in the report includes a plurality of fixed-data columns retrieved from the data source, at least one flexible-data column, and a control for the flexible-data column retrieved from the data source,
      the fixed data columns are part of the report and data fields of the fixed data columns are not user customizable, and
      the flexible-data column is user customizable by using the control to select one from a set of enumerated data fields that can alternatively be displayed in the flexible-data column, including at least two data fields having distinct data formats, including a textual format and a graphical format; wherein each of the data fields in the set of enumerated data fields corresponds to a different characteristic of an object represented by a row of the report;
   responsive to selection of one of the enumerated data fields of a distinct data format, causing retrieval of data corresponding to a characteristic of the distinct data format specific to each row of the report and display of the retrieved characteristic in the flexible-data column for each row; and
   sending the generated data for display to the user system.

2. The method of claim 1, wherein generating data for display further includes:
   the data for display modifies a data display format of the flexible-data column responsive to a data format of the selected data field.

3. The method of claim 1, wherein the control responds to hovering over one from the set of enumerated data fields by enabling display of selected data field values in the flexible-data column.

4. The method of claim 1, wherein the control responds to hovering over one from the set of enumerated data fields by enabling display of a graphical representation of selected data field values in the flexible-data column.

5. The method of claim 1, wherein generating data for display further includes two or more flexible-data columns visible with the fixed-data columns on a single display page.

6. A system that generates data for display by a user system, comprising:
   a processor, memory coupled to the processor, and program instructions loaded into the memory that, when executed on the processor, make the system capable of:
      receiving a request for a report from a data source;
      generating data for display assembled from the data source responsive to the received request, wherein
         the data for display in the report includes a plurality of fixed-data columns retrieved from the data source, at least one flexible-data column, and a control for the flexible-data column retrieved from the data source,
         the fixed data columns are part of the report and data fields of the fixed data columns are not user customizable, and
         the flexible-data column is user customizable by using the control to select one from a set of enumerated data fields that can alternatively be displayed in the flexible-data column, including at least two data fields having distinct data formats, including a textual format and a graphical format; wherein each of the data fields in the set of enumerated data fields corresponds to a different characteristic of an object represented by a row of the report;
      responsive to selection of one of the enumerated data fields of a distinct data format, causing retrieval of data corresponding to a characteristic of the distinct data format specific to each row of the report and display of the retrieved characteristic in the flexible-data column for each row; and
      sending the generated data for display to the user system.

7. The system of claim 6, wherein generating data for display further includes:
   the data for display modifies a data display format of the flexible-data column responsive to a data format of the selected data field.

8. The system of claim 6, wherein the control responds to hovering over one from the set of enumerated data fields by enabling display of selected data field values in the flexible-data column.

9. The system of claim 6, wherein the control responds to hovering over one from the set of enumerated data fields by enabling display of a graphical representation of selected data field values in the flexible-data column.

10. The system of claim 6, wherein generating data for display further includes two or more flexible-data columns visible with the fixed-data columns on a single display page.

11. A method of accessing data for display by a user system, comprising:

transmitting a request for a report from a data source;

receiving, in response to the request, data for display assembled from the data source, wherein the data for display in the report includes a plurality of fixed-data columns retrieved from the data source, at least one flexible-data column, and a control for the flexible-data column retrieved from the data source, the fixed data columns are part of the report and are not user customizable, and the flexible-data column is user customizable by using the control to select one from a set of enumerated data fields that can alternatively be displayed in the flexible-data column, including at least two data fields having distinct data formats, including a textual format and a graphical format; wherein each of the data fields in the set of enumerated data fields corresponds to a different characteristic of an object represented by a row of the report; and receiving data representing a user selection of one of the enumerated data fields using the control;

responsive to selection of one of the enumerated data fields of a distinct data format, accessing data corresponding to a characteristic of the distinct data format specific to each row of the report; and using the accessed data to cause a user system to render a graphical display of the characteristic in the flexible-data column for each row.

12. The method of claim 11, wherein the data for display modifies a data display format of the flexible-data column responsive to a data format of the selected data field.

13. The method of claim 11, wherein the control responds to hovering over one from the set of enumerated data fields by enabling display of selected data field values in the flexible-data column.

14. The method of claim 11, wherein the control responds to hovering over one from the set of enumerated data fields by enabling display of a graphical representation of selected data field values in the flexible-data column.

15. The method of claim 11, wherein generating data for display further includes two or more flexible-data columns visible with the fixed-data columns on a single display page.

16. A non-transitory computer readable media storing program instructions that, when executed on a processor of a user system, make the user system capable of:

transmitting a request for a report;

receiving, in response to the request, data for display assembled from a data source, wherein the data for display in the report includes a plurality of fixed-data columns, at least one flexible-data column, and a control for the flexible-data column, the fixed data columns are part of the report and are not user customizable, and the flexible-data column is user customizable by using the control to select one from a set of enumerated data fields that can alternatively be displayed in the flexible-data column, including at least two data fields having distinct data formats, including a textual format and a graphical format; wherein each of the data fields in the set of enumerated data fields corresponds to a different characteristic of an object represented by a row of the report; and receiving data representing a user selection of one of the enumerated data fields using the control;

responsive to selection of one of the enumerated data fields of a distinct data format, accessing data corresponding to a characteristic of the distinct data format specific to each row of the report; and using the accessed data to cause a user system to render a graphical display of the characteristic in the flexible-data column for each row.

17. The non-transitory computer readable media of claim 16, wherein the data for display modifies a data display format of the flexible-data column responsive to a data format of the selected data field.

18. The non-transitory computer readable media of claim 16, wherein the control responds to hovering over one from the set of enumerated data fields by enabling display of selected data field values in the flexible-data column.

19. The non-transitory computer readable media of claim 16, wherein the control responds to hovering over one from the set of enumerated data fields by enabling display of a graphical representation of selected data field values in the flexible-data column.

20. The non-transitory computer readable media of claim 16, wherein generating data for display further includes two or more flexible-data columns visible with the fixed-data columns on a single display page.

21. The method of claim 5, wherein at least one fixed-data column is visible between the two or more flexible-data columns visible on a single display page.

22. The method of claim 1, wherein the control is positioned proximate to a heading of the flexible-data column.

23. The method of claim 1, further including sorting the displayed content of the flexible-data column.

24. The method of claim 23, wherein sorting includes arranging textual format data according to alphabetical or reverse alphabetical order.

25. The method of claim 1, further including changing appearance of data in the flexible-data column when the flexible-data column is selected.

26. The method of claim 1, wherein at least two of the enumerated data fields are not computationally related to one another.

* * * * *